US012687384B2

(12) United States Patent
Harper et al.

(10) Patent No.: US 12,687,384 B2
(45) Date of Patent: Jul. 21, 2026

(54) APPARATUS AND METHODS TO ENHANCE SIGNAL TO NOISE RATIO IMAGING PERFORMANCE IN OPTICAL COHERENCE TOMOGRAPHY

(71) Applicant: The General Hospital Corporation, Boston, MA (US)

(72) Inventors: Danielle J. Harper, Somerville, MA (US); Benjamin J. Vakoc, Arlington, MA (US)

(73) Assignee: The General Hospital Corporation, Boston, MA (US)

( * ) Notice: Subject to any disclaimer, the term of this patent is extended or adjusted under 35 U.S.C. 154(b) by 227 days.

(21) Appl. No.: 18/573,335

(22) PCT Filed: Jun. 22, 2022

(86) PCT No.: PCT/US2022/034465
§ 371 (c)(1),
(2) Date: Dec. 21, 2023

(87) PCT Pub. No.: WO2022/271787
PCT Pub. Date: Dec. 29, 2022

(65) Prior Publication Data
US 2024/0230316 A1      Jul. 11, 2024

Related U.S. Application Data

(60) Provisional application No. 63/213,554, filed on Jun. 22, 2021.

(51) Int. Cl.
*G01B 9/02091* (2022.01)
*G01B 9/02* (2022.01)
(Continued)

(52) U.S. Cl.
CPC ..... *G01B 9/02091* (2013.01); *G01B 9/02009* (2013.01); *G01B 9/02044* (2013.01); *G01B 9/02004* (2013.01); *G01J 3/45* (2013.01)

(58) Field of Classification Search
CPC ........... G01B 9/02091; G01B 9/02009; G01B 9/02044; G01B 9/02004; G01J 3/45
See application file for complete search history.

(56) References Cited

U.S. PATENT DOCUMENTS

| | | | |
|---|---|---|---|
| 5,923,466 A | 7/1999 | Krause et al. | |
| 9,574,869 B2 | 2/2017 | Johnson et al. | |

(Continued)

FOREIGN PATENT DOCUMENTS

| | | |
|---|---|---|
| JP | 2005-531346 A | 10/2005 |
| JP | 2011-528111 A | 11/2011 |

OTHER PUBLICATIONS

Hao, Qiangjiang, et al. "High signal-to-noise ratio reconstruction of low bit-depth optical coherence tomography using deep learning." Journal of biomedical optics 25.12 (2020): 123702-123702. (Year: 2020).*

(Continued)

*Primary Examiner* — Dominic J Bologna
(74) *Attorney, Agent, or Firm* — QUARLES & BRADY LLP

(57) ABSTRACT

An optical coherence tomography system which is capable of operating in two or more optical bandwidth configurations for the purpose of trading off between high resolution imaging and high signal-to-noise ratio imaging, wherein the later enables deeper imaging depth. The system and associated methods allow for both high resolution, shallow penetration depth and low resolution, deep penetration depth optical coherence tomography imaging to be performed using a single light source. Methods and apparatus are described that allow a single system to dynamically switch (Continued)

between modes, or to operate in a hybrid mode that achieves a balance between resolution and SNR/depth of penetration.

18 Claims, 13 Drawing Sheets

(51) Int. Cl.
*G01B 9/02001* (2022.01)
*G01B 9/02004* (2022.01)
*G01J 3/45* (2006.01)

(56) References Cited

U.S. PATENT DOCUMENTS

| | | | |
|---|---|---|---|
| 9,883,810 | B2 | 2/2018 | Jia et al. |
| 10,101,148 | B2 | 10/2018 | Murata et al. |
| 11,058,297 | B2 | 7/2021 | Schmoll |
| 2011/0176142 | A1* | 7/2011 | Hacker .............. G01B 9/02009 |
| | | | 356/479 |
| 2013/0163003 | A1 | 6/2013 | Massow et al. |
| 2014/0276025 | A1* | 9/2014 | Durbin ................. A61B 3/0025 |
| | | | 600/407 |
| 2017/0332880 | A1 | 11/2017 | Ito |
| 2019/0216313 | A1* | 7/2019 | Schmoll ................. A61B 3/102 |
| 2019/0301939 | A1* | 10/2019 | Medhat ................... G01J 3/021 |

OTHER PUBLICATIONS

Smith, Gennifer T., et al. "Automated, depth-resolved estimation of the attenuation coefficient from optical coherence tomography data." IEEE transactions on medical imaging 34.12 (2015): 2592-2602. (Year: 2015).*

Notification of Reasons for Refusal in Japanese Application No. 2023-578903; received on Aug. 5, 2025.

Bonesi, M. et al., Akinetic All-Semiconductor Programmable Swept-Source at 1550 nm and 1310 nm with Centimeters Coherence Length, Optics Express, 2014, 22(3):2632-2655.

Cimalla, P. et al., Axial Resolution Improvement by Spectral Data Fusion in Simultaneous Dual-Band Optical Coherence Tomography, In European Conference on Biomedical Optics, 2011, 6 pages.

Gob, M. et al., Continuous Spectral Zooming for In Vivo Live 4D-OCT with MHz A-scan Rates and Long Coherence, Biomedical Optics Express, 2022, 13(2):713-727.

Gora, M. et al., Ultra High-Speed Swept Source OCT Imaging of the Anterior Segment of Human Eye at 200 KHz with Adjustable Imaging Range, Optics Express, 2009, 17(17):14880-14894.

Harper, D. et al., Hyperspectral Optical Coherence Tomography for In Vivo Visualization of Melanin in the Retinal Pigment Epithelium, Journal of Biophotonics, 2019, 12:e201900153, pp. 1-14.

Harper, D. et al., Relationship Between Axial Resolution and Signal-to-Noise Ratio in Optical Coherence Tomography, Optics Letters, 2022, 47(6):1517-1520.

Jia, Y. et al., Split-Spectrum Amplitude-Decorrelation Angiography with Optical Coherence Tomography, Optics Express, 2012, 20(4):4710-4725.

Klein, T. et al., High-Speed OCT Light Sources and Systems, Biomedical Optics Express, 2017, 8(2):828-859.

Kray, S. et al., High-Resolution Simultaneous Dual-Band Spectral Domain Optical Coherence Tomography, Optics Letters, 2009, 34(13):1970-1972.

Moon, S. et al., VCSEL-based Swept Source for Low-Cost Optical Coherence Tomography, Biomedical Optics Express, 2017, 8(2):1110-1121.

Morgner, U. et al., Spectroscopic Optical Coherence Tomography, Optics Letters, 2000, 25(2):111-113.

Pfeiffer, T. et al., Long-Range Live 3D-OCT at Different Spectral Zoom Levels, Proc. of SPIE-OSA, 2017, vol. 10416, pp. 1-4.

Schmitt, J. et al., Speckle in Optical Coherence Tomography, Journal of Biomedical Optics, 1999, 4(1):95-105.

Siddiqui, M. et al., High-Speed Optical Coherence Tomography by Circular Interferometric Ranging, Nature Photonics, 2018, 12:111-116.

Song, W. et al., Visible Light Optical Coherence Tomography Angiography (vis-OCTA) Facilitates Local Microvascular Oximetry in the Human Retina, Biomedical Optics Express, 2020, 11(7):4037-4051.

Vakoc, B. et al., Three-Dimensional Microscopy of the Tumor Microenvironment In Vivo Using Optical Frequency Domain Imaging, Nature Medicine, 2009, 15(10):1219-1223.

Villiger, M. et al., Spectral Binning for Mitigation of Polarization Mode Dispersion Artifacts in Catheter-Based Optical Frequency Domain Imaging, Optics Express, 2013, 21(14):16353-16369.

PCT International Search Report and Written Opinion, PCT/US2022/034465, Oct. 7, 2022, 16 pages.

* cited by examiner

APPARATUS AND METHODS TO ENHANCE SIGNAL TO NOISE RATIO IMAGING PERFORMANCE IN OPTICAL COHERENCE TOMOGRAPHY

CROSS-REFERENCE TO RELATED APPLICATIONS

The present application represents the U.S. national stage entry of International Patent Application Ser. No. PCT/US2022/034465, filed on Jun. 22, 2022, which is based on and claims priority from U.S. Patent Application Ser. No. 63/213,554, filed on Jun. 22, 2021, the entire disclosures of which are incorporated herein by reference.

STATEMENT REGARDING FEDERALLY SPONSORED RESEARCH

This invention was made with government support under grant number FA9550-20-10063 awarded by the National Institutes of Health. The government has certain rights in the invention.

BACKGROUND

An optical coherence tomography (OCT) system receives and analyzes light backscattered from a sample in order to construct an image of that sample. The backscattered light is measured at a multitude of optical wavelengths, and the axial resolution of the measurement depends upon the particular set of optical wavelengths that are included within the measurement set and the optical power provided to the sample at each of these wavelengths. Generally, the axial resolution improves (gets smaller) when the analysis includes a broader set of wavelengths and/or distributes optical power broadly across measured wavelengths (yielding a broader optical bandwidth). The axial resolution degrades (gets larger) when the analysis includes a more restricted set of wavelengths and/or concentrates optical power to a narrow range of wavelengths (yielding a less broad or narrower optical bandwidth). Because axial resolution is often a critical factor in OCT imaging, many systems are configured to provide broadband optical illumination. Generally, it has been viewed that there is no reason, based on imaging performance, to not maximize optical bandwidth.

SUMMARY

What is needed are techniques that allow an OCT system to change its imaging performance, in terms of axial resolution and signal-to-noise, dynamically.

In the present disclosure, we make use of a previously undescribed second consequence of optical bandwidth on image performance, namely that the optical bandwidth also affects the measurement signal-to-noise ratio when the optical coherence tomography instrument is used to image a diffusely scattering sample such as biological tissue. This means that two OCT systems that operate with the same A-line rate and illuminate the sample with the same average power, but which provide light with two different optical bandwidths, can generate images with different signal-to-noise properties. The system that uses the broader optical bandwidth will have a lower (worse) signal-to-noise. Therefore, the optical bandwidth of an OCT system affects both the axial resolution and the measurement signal-to-noise ratio. This creates an opportunity to tune system performance toward better axial resolution or toward better SNR based on controlling the optical bandwidth of the imaging light. There are many scenarios wherein one might choose to degrade axial resolution in order to improve SNR, for example, when attempting to increase imaging depth (penetration depth).

This effect can be used to design an OCT system that operates with a specific optical bandwidth that is chosen to achieve a compromise between the competing goals of axial resolution and SNR. However, an OCT system might sometimes need to place more importance on axial resolution, and at other times place more weight on SNR. There are disadvantages to configuring an OCT system to provide a fixed level of axial resolution and signal-to-noise performance.

The present invention relates to the field of optical coherence tomography. Specifically, the present invention relates to a system whereby the imaging properties of measurement signal to noise ratio and measurement axial resolution are configurable through manipulation of the optical spectrum of the imaging light and/or the configuration of the processing algorithms that are applied to data acquired with a light source that is specifically configured for this purpose.

Thus, the disclosure provides embodiments of an optical coherence tomography system which is capable of operating in two or more optical bandwidth configurations for the purpose of trading off between high resolution imaging and high signal-to-noise ratio imaging, wherein the later enables deeper imaging depth. The system and associated methods allow for both high resolution, shallow penetration depth and low resolution, deep penetration depth optical coherence tomography imaging to be performed using a single light source. Novel methods and apparatus are described that allow a single system to dynamically switch between modes, or to operate in a hybrid mode that achieves a balance between resolution and SNR/depth of penetration. It is envisioned that this is of particular relevance to the posterior ocular OCT market, where high resolution retinal imaging is required but deep penetration is also required to see features of the optic nerve head. This could be integrated into commercial retinal OCT imaging systems. This is also highly relevant to intravascular OCT systems where imaging depth is a critical factor. For both, imaging time and imaging power are constrained, so these are not viable methods to increase SNR, making the approach described herein especially important. These configurations can be implemented with minimal additional system complexity, providing enhanced performance at a small, perhaps negligible, cost.

Accordingly, disclosed herein is a set of preferred embodiments describing the design and operation of OCT systems that allow axial resolution and SNR to be changed dynamically by operating in at least two illumination states. These states are distinguished by having different optical bandwidths, which in turn affect both axial resolution and SNR. Operation of the system in the first state providing the larger optical bandwidth would be capable of producing higher resolution images with a lower signal-to-noise ratio. Operating the system in a second state that has a smaller optical bandwidth than the first state would result in a comparatively higher signal-to-noise performance at the expense of axial resolution. Of course, improved signal-to-noise performance can be utilized for a number of reasons including making more accurate measurements and imaging deeper into a sample. In these preferred embodiments, one or more light sources are used as an input to the optical coherence tomography system and include sources that are based on a wavelength-swept configuration, a continuously broadband configuration, a wavelength-stepped configuration, and a discretely structured broadband configuration.

In one construction, the disclosure provides an optical coherence tomography (OCT) system, including: a light source configured to provide a first illumination and a second illumination to a diffuse scattering sample, the first illumination providing light within a first bandwidth and the second illumination providing light within a second bandwidth narrower than the first bandwidth; an OCT optical arrangement including a sample light path and a reference light path, each of which is optically coupled to the light source to generate interference data from the sample; a detector optically coupled to the OCT optical arrangement and configured to collect the interference data from the sample; and a controller configured to switch illumination provided to the OCT optical arrangement between the first illumination and the second illumination, the interference data including first interference data obtained using the first illumination and second interference data obtained using the second illumination.

In one construction, the disclosure provides an optical coherence tomography (OCT) system, including: a light source configured to provide a first illumination and a second illumination to a diffuse scattering sample, the first illumination providing light within a first bandwidth and the second illumination providing light within a second bandwidth narrower than the first bandwidth; an OCT optical arrangement including a sample light path and a reference light path, each of which is optically coupled to the light source to generate interference data from the sample; a detector including a spectrometer optically coupled to the OCT optical arrangement and configured to collect the interference data from the sample as a function of wavelength; and a controller configured to switch illumination provided to the OCT optical arrangement between the first illumination and the second illumination, the interference data including first interference data obtained using the first illumination and second interference data obtained using the second illumination, and a ratio of the first bandwidth to the second bandwidth being at least 2.

In another construction, the disclosure provides an optical coherence tomography (OCT) system, including: a light source configured to provide a first illumination and a second illumination to a diffuse scattering sample, the first illumination providing light within a first bandwidth including a first wavelength vs. time profile and a first power vs. time profile, and the second illumination providing light within a second bandwidth narrower than the first bandwidth, the second illumination including a second wavelength vs. time profile and a second power vs. time profile; an OCT optical arrangement including a sample light path and a reference light path, each of which is optically coupled to the light source to generate interference data from the sample; a detector optically coupled to the OCT optical arrangement and configured to collect the interference data from the sample; and a controller configured to control the light source to switch illumination provided to the OCT optical arrangement between the first illumination and the second illumination by controlling at least one of the first wavelength vs. time profile or the first power vs. time profile of the first illumination and by controlling at least one of the second wavelength vs. time profile or the second power vs. time profile of the second illumination, the interference data including first interference data obtained using the first illumination and second interference data obtained using the second illumination.

In still another construction, the disclosure provides a method for performing optical coherence tomography (OCT), including: providing, using a light source, a first illumination and a second illumination to a diffuse scattering sample, the first illumination providing light within a first bandwidth and the second illumination providing light within a second bandwidth narrower than the first bandwidth; generating, using an OCT optical arrangement including a sample light path and a reference light path each of which is optically coupled to the light source, interference data from the sample; collecting, using a detector optically coupled to the OCT optical arrangement, the interference data from the sample; and switching, using a controller, illumination provided to the OCT optical arrangement between the first illumination and the second illumination, the interference data including first interference data obtained using the first illumination and second interference data obtained using the second illumination.

In still another construction, the disclosure provides a method for performing optical coherence tomography (OCT), including: providing, using a light source, a first illumination and a second illumination to a diffuse scattering sample, the first illumination providing light within a first bandwidth and the second illumination providing light within a second bandwidth narrower than the first bandwidth; generating, using an OCT optical arrangement including a sample light path and a reference light path each of which is optically coupled to the light source, interference data from the sample; collecting, using a detector including a spectrometer optically coupled to the OCT optical arrangement, the interference data from the sample as a function of wavelength; and switching, using a controller, illumination provided to the OCT optical arrangement between the first illumination and the second illumination, the interference data including first interference data obtained using the first illumination and second interference data obtained using the second illumination, and a ratio of the first bandwidth to the second bandwidth being at least 2.

In another construction, the disclosure provides a method for performing optical coherence tomography (OCT), including: providing, using a light source, a first illumination and a second illumination to a diffuse scattering sample, the first illumination providing light within a first bandwidth including a first wavelength vs. time profile and a first power vs. time profile, providing, using the light source, light within a second bandwidth narrower than the first bandwidth, the second illumination including a second wavelength vs. time profile and a second power vs. time profile; generating, using an OCT optical arrangement including a sample light path and a reference light path each of which is optically coupled to the light source, interference data from the sample; collecting, using a detector optically coupled to the OCT optical arrangement, the interference data from the sample; and controlling, using a controller, the light source to switch illumination provided to the OCT optical arrangement between the first illumination and the second illumination by controlling at least one of the first wavelength vs. time profile or the first power vs. time profile of the first illumination and by controlling at least one of the second wavelength vs. time profile or the second power vs. time profile of the second illumination, the interference data including first interference data obtained using the first illumination and second interference data obtained using the second illumination.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

It will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the disclosure and the claims.

Various embodiments and aspects of the disclosure will be described with reference to details discussed below, and the accompanying drawings will illustrate the various embodiments. The following description and drawings are illustrative of the disclosure and are not to be construed as limiting. Numerous specific details are described to provide a thorough understanding of various embodiments of the present disclosure. However, in certain instances, well-known or conventional details are not described in order to provide a concise discussion of embodiments.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

Relationship Between Axial Resolution and Signal-to-Noise in OCT

An OCT system provides depth-resolved measurements from a sample. An OCT system comprises a light source, an interferometer arrangement that delivers light from the source to a sample and to a reference path within the OCT system. Light reflected from the sample is captured by the OCT system and mixed with the reference field using common OCT methods. The interference signal is detected and digitized and provided to a computer arrangement. The computer arrangement generates an image based at least on this digitized signal.

Figure 1:
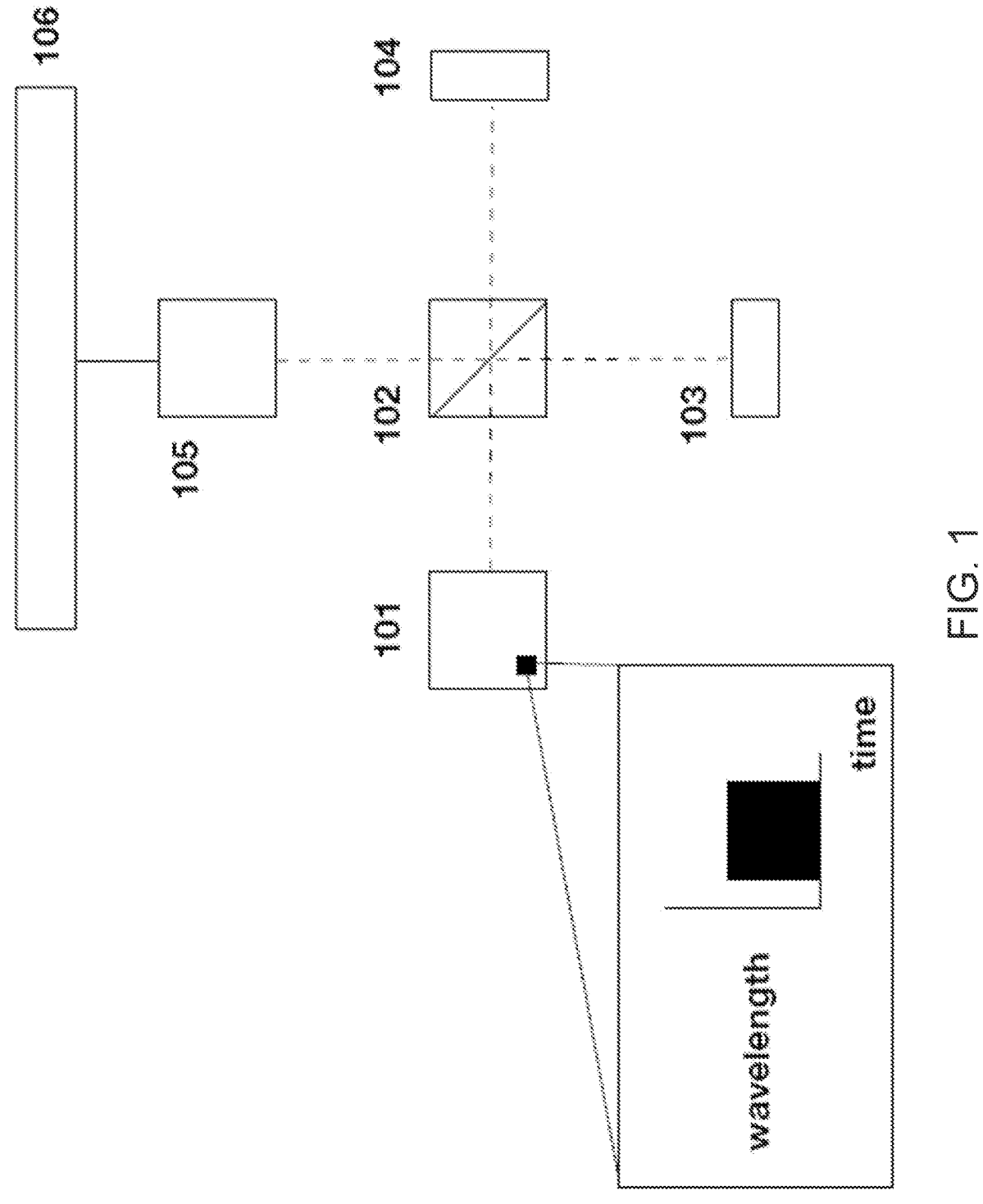
FIG. 1 illustrates an example of a spectral domain OCT system according to various embodiments of the present disclosure described herein.

An exemplary OCT system based on a broadband source is presented in FIG. 1. The broadband light source 101 provides light to the beam splitter 102, where light is split into sample and reference arms. In the sample arm, the light hits sample 103 and is then captured and directed to interfere with light from reference arm 104. The optical interference is directed to the detector 105 that can measure the light as a function of wavelength, e.g., a spectrometer. This mixing of sample reflections with a reference light field can be realized using, for example, Michelson interferometry (as shown in FIG. 1) or Mach-Zehnder interferometry. The readout from the spectrometer, or a similar device, is then forwarded to computer arrangement 106 for signal/image reconstruction and other processing steps.

Figure 2:
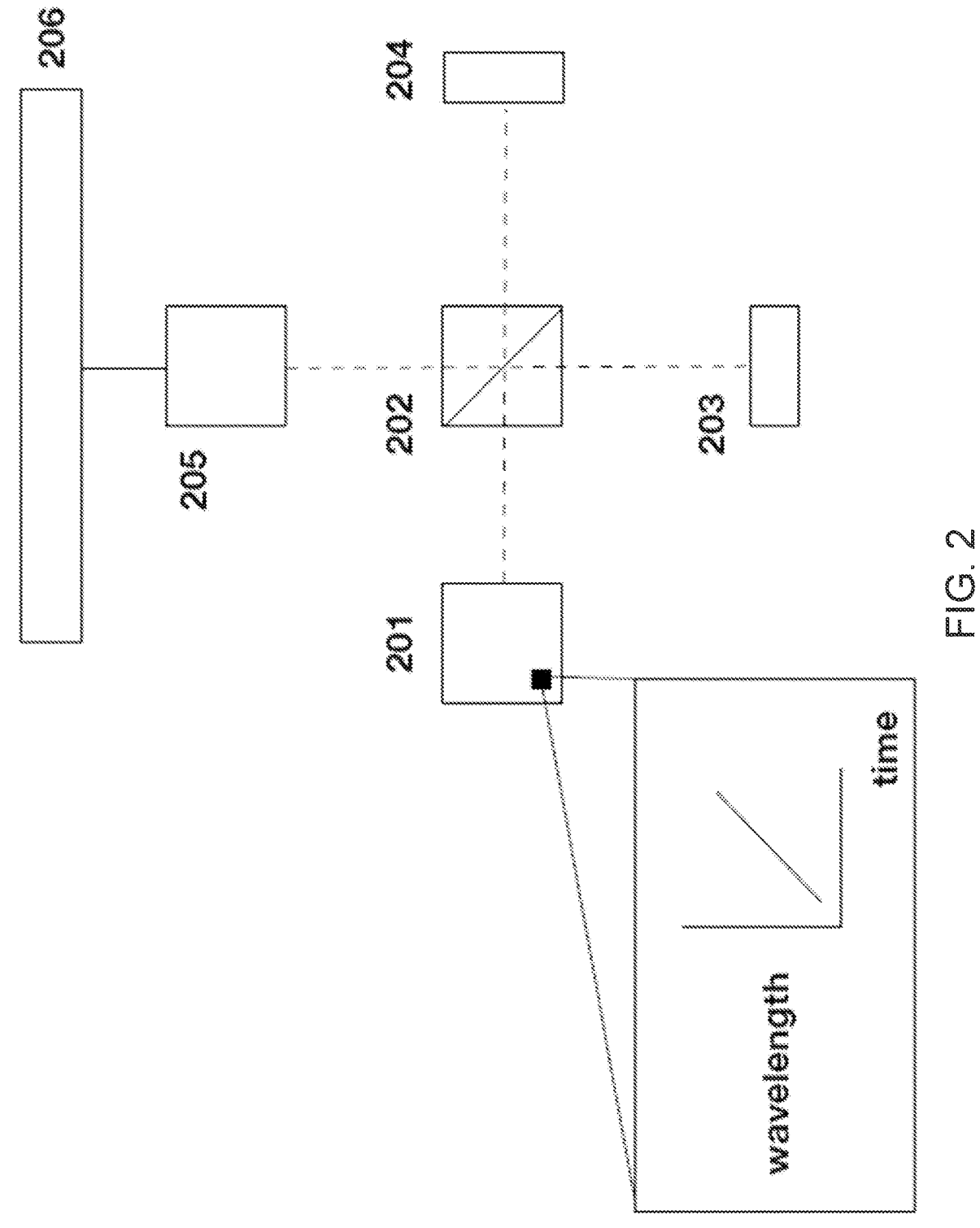
FIG. 2 illustrates an example of a swept source OCT system according to various embodiments of the present disclosure described herein.

An exemplary OCT system based on a wavelength-swept source is presented in FIG. 2. The wavelength-swept light source 201 provides light to a beam splitter 202, where light is split into separate sample and reference arms. In the sample arm, the light is directed to a sample 203 and the light reflected from the sample is captured and directed to interfere with light from reference arm 204. The recombined light is directed to the detector 205 that can measure the light as a function of time, e.g., a single-ended or balanced detector. While FIG. 2 presents this using a Michelson interferometer, this could also be realized using Mach Zehnder interferometry techniques. The readout from the detector, or similar device, is then forwarded to computer arrangement 206 for signal/image reconstruction and other processing steps.

In OCT, there is an inverse relationship between optical bandwidth and imaging axial resolution. Imaging with a larger optical bandwidth provides a smaller axial resolution. To avoid confusion in terminology, we note that as the axial resolution gets smaller, the imaging resolution gets higher. Stated another way, a high-resolution system provides measurements with smaller resolution. Because of this relationship, it has been common in the field to design OCT systems that maximize the optical bandwidth of the imaging system in order to achieve the smallest possible axial resolution.

Figure 3:
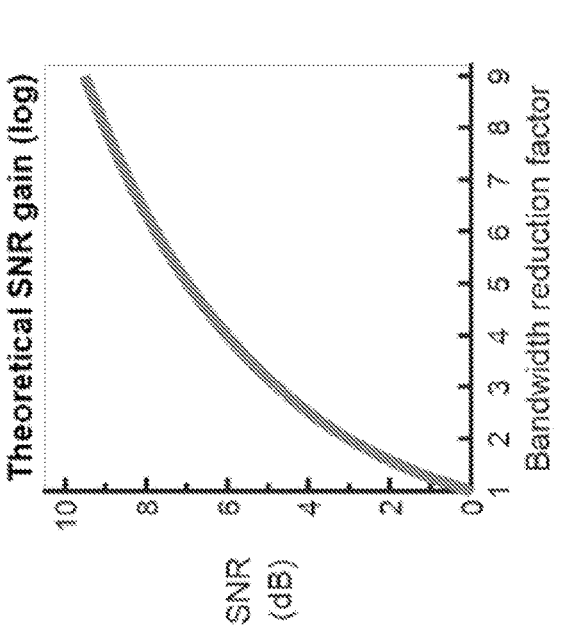
FIG. 3 illustrates the relationship between optical bandwidth reduction and signal-to-noise ratio for diffusely scattering samples in OCT.

This patent application is based on our insight that the optical bandwidth of an OCT measurement also affects the imaging signal-to-noise ratio (SNR), which has not been previously understood or described. The relationship between optical bandwidth and SNR depends on the sample being imaged. For specular reflections such as those from mirrors, there is no dependence of SNR on optical bandwidth. For diffuse scattering samples, such as biological tissues, the measurement SNR increases as the optical bandwidth decreases, as shown in FIG. 3. Given that OCT is predominantly used to image diffuse scattering samples and that measurement SNR is a critical imaging parameter, this can be leveraged to improve imaging performance.

We can consider, as an example, two swept-source OCT system designs that illuminate a sample, following an argument presented below. Each system provides the same optical power, operates with the same A-line duration, and is characterized by the same level of relative intensity noise (RIN). The first swept-source OCT system is configured to sweep its laser across a 100 nm optical bandwidth. The second swept-source OCT system is configured to sweep its laser over a more limited 10 nm optical bandwidth. The noise performance for each system is determined by the optical noise of the reference arm field, which is the same for both systems (noise does not depend on the sweep bandwidth). The signal power within each depth-resolved measurement scales inversely with optical bandwidth. This is because a lower optical bandwidth captures the signal across a larger depth range, which implies that there is a larger number of scatterers that contribute to that measurement. The 100 nm system, for example, captures the light that is scattered within an approximately 7 μm depth range. The 10 nm system captures the backscattered light within an approximately 70 μm depth range. There are nominally 10 times more scatterers within the 70 μm range than the 7 μm voxel (assuming constant reflectivity), leading to a 10-fold higher signal in each voxel and a 10-fold higher SNR (10 dB). This discussion was presented for swept-source OCT systems to provide an example, but it applies equivalently to other OCT architectures including but not limited to spectral-domain OCT, optical frequency-stepped systems, frequency-comb OCT systems, and circular-ranging OCT systems that utilize a source with a discrete set of optical frequency lines.

Note that a specular reflection such as a mirror yields an SNR that is independent of optical bandwidth because there is the same number of scatterers in the 70 μm range as the 7 μm range, assuming the reflective boundary is located at the center of each range.

One important implication of this phenomenon is that the SNR of an OCT measurement is minimally affected by imposing an optical bandwidth narrowing window in post-processing such as is done in split-spectrum angiography, spectral-binning polarization-sensitive OCT, frequency compounding for speckle reduction, and spectroscopic or hyper-spectral OCT. Here, the windowing narrows the effective optical bandwidth, which increases the SNR, but also reduces the effective imaging power (by discarding photons received outside the window) which decreases SNR. These effects cancel and produce measurements with nominally the same SNR. This is important in that it allows these methods to be used without an SNR penalty.

The effects described in this work, while demonstrated in the near-infrared wavelength range, apply equally to other wavelength ranges including, but not limited to, the visible light range (e.g., 380 nm-780 nm), the ultraviolet light range (e.g., 100 nm-380 nm), and the infrared light range (e.g., 780 nm-1 mm).

Figure 4:
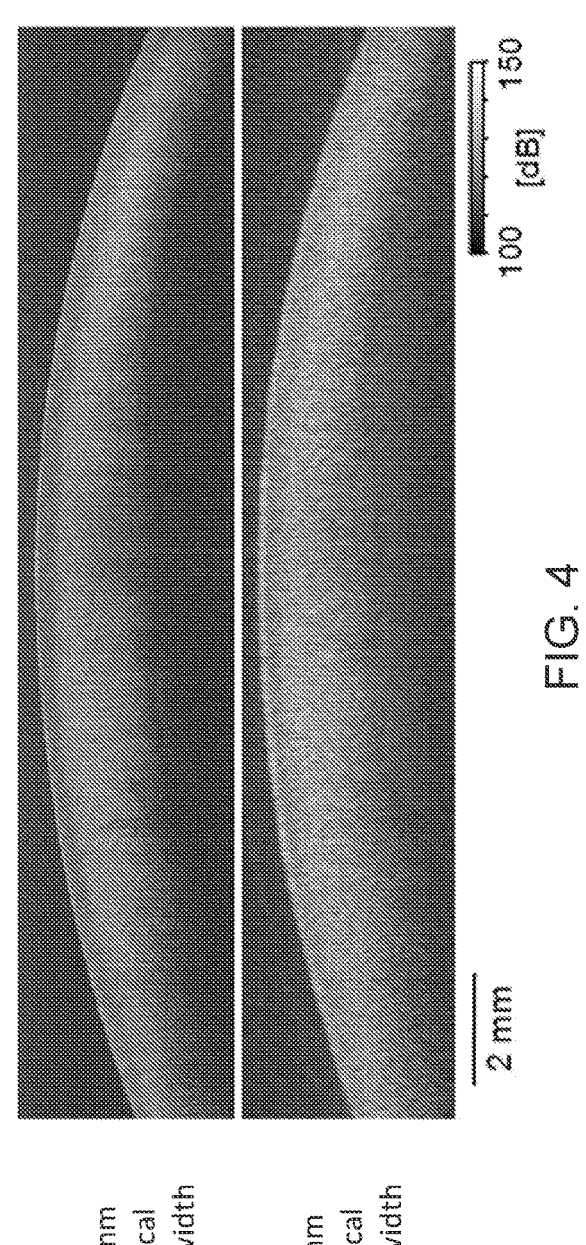
FIG. 4 illustrates an example of the increased penetration depth/SNR afforded by a reduction in optical bandwidth in OCT.

Configuring an OCT System to Image Deeper Within a Sample by Using a Reduced Optical Bandwidth Source The coupling between optical bandwidth and SNR can be used to enhance the SNR of an OCT system for a given imaging power and A-line duration. This enhanced SNR allows imaging of deeper regions of a sample. A swept-source OCT system was used with a fixed optical power of 9 mW and a fixed A-line duration of 20 μs. The system was configured to image with a first optical bandwidth of 100 nm and a second optical bandwidth of 16 nm by adjusting the rotational speed of a polygon mirror located within the swept-wavelength laser source. Porcine knee cartilage was imaged. FIG. 4 shows images acquired with each of these two OCT system configurations. The image acquired using the smaller optical bandwidth displays a higher SNR and can resolve a deeper boundary that is not visible in the image acquired with the larger optical bandwidth. The SNR of an ROI was measured quantitatively for the two systems and was shown to be 9 dB higher when using the smaller optical bandwidth.

OCT Imaging Using Multi-State Illumination

Figure 5:
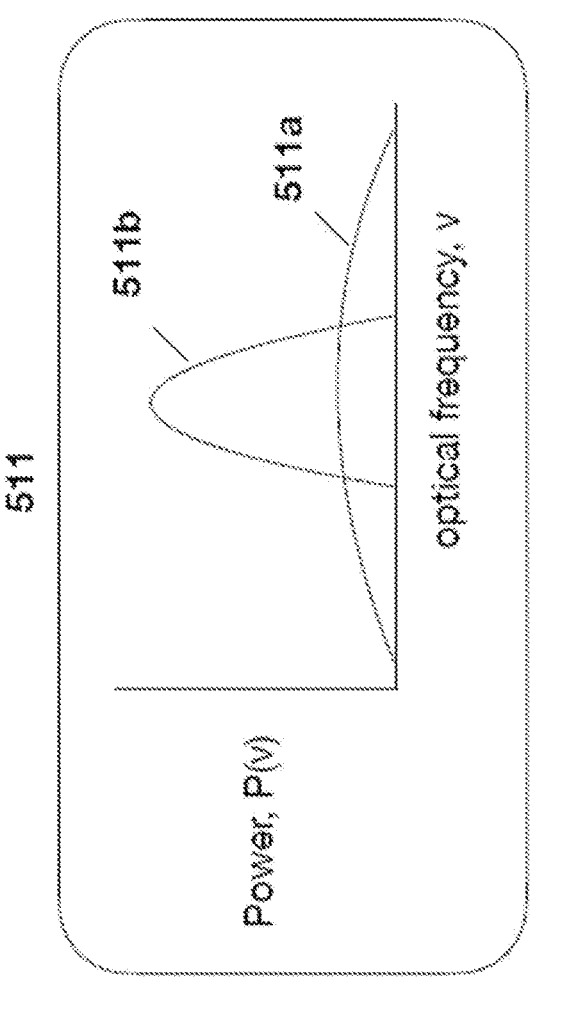
FIG. 5 illustrates an example of input OCT light modulated through control of at least the spectral properties of the light provided to the sample according to various embodiments of the present disclosure described herein.
Figure 5:
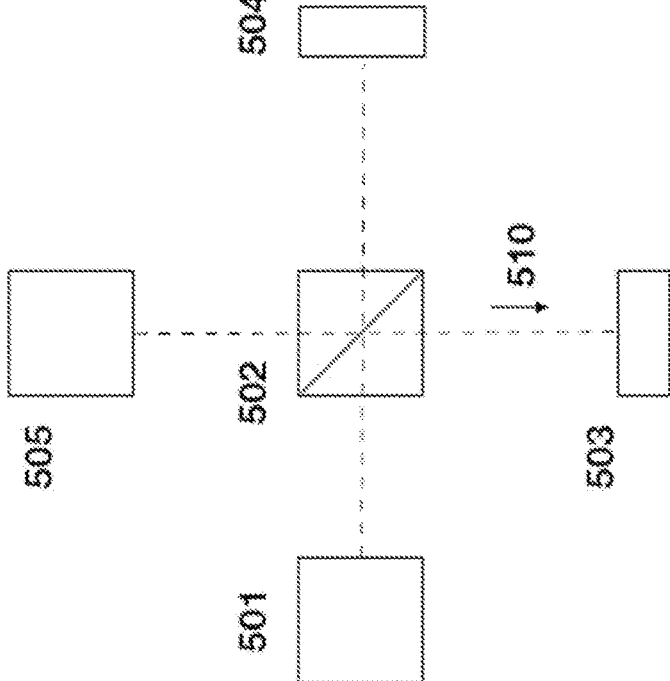
Figure 6:
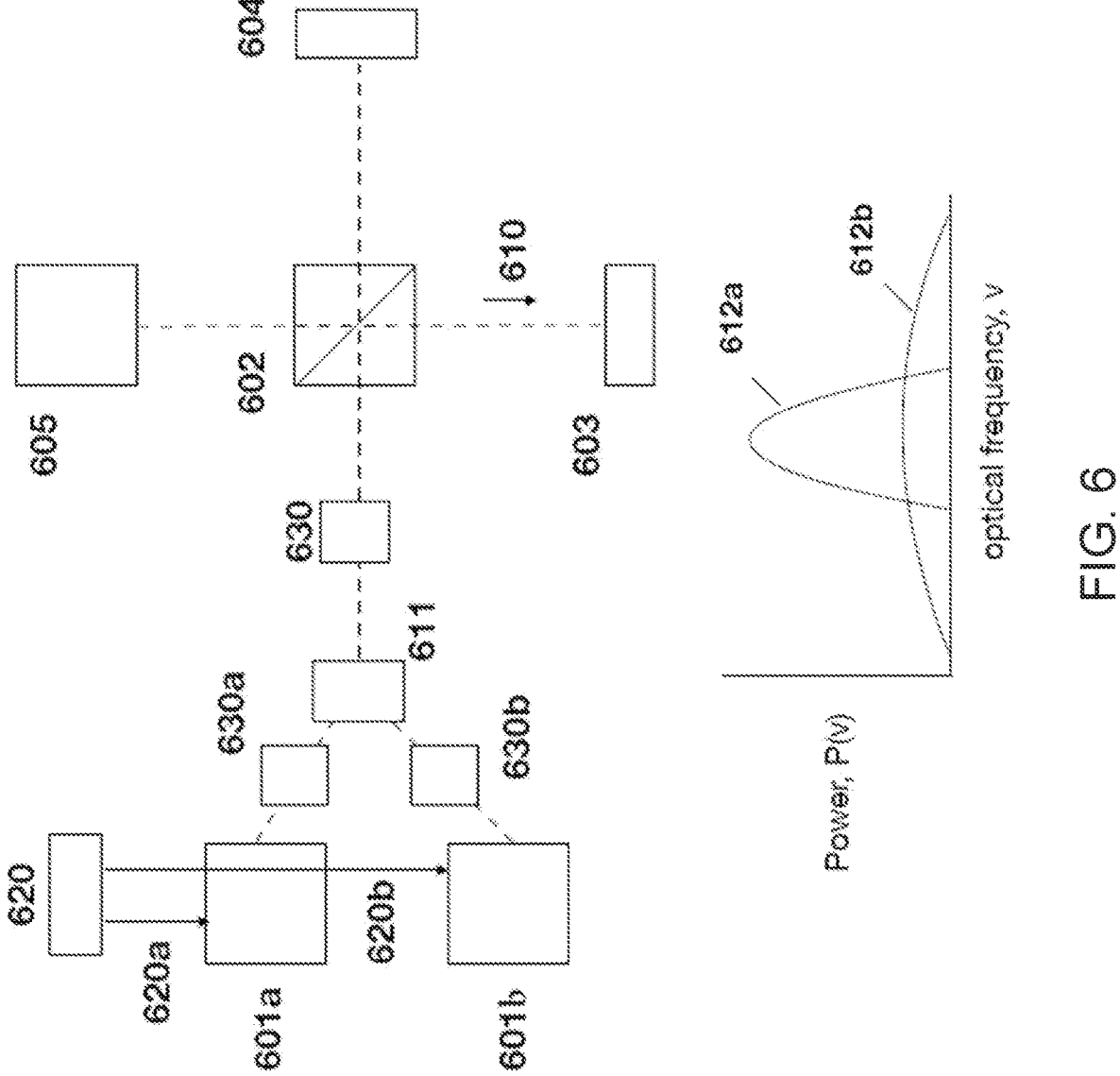
FIG. 6 illustrates an OCT system comprising at least two broadband spectral sources according to various embodiments of the present disclosure described herein.

In a first set of preferred embodiments, an OCT system is configured to allow the imaging performance metrics of axial resolution and SNR to be modulated through control of at least the spectral properties of the light provided to the sample. FIG. 5 presents this configuration. The light provided to the sample (510) is controlled by the OCT system such that this illumination light is provided in one of at least two possible states. The states are differentiated at least by providing light with different spectral properties to the sample. The spectral properties of the light provided to the sample can be characterized by its power spectral density, $P(v)$.

The optical bandwidth of this illumination can be calculated by numerous methods. A common method is to calculate the optical bandwidth by the full-width and half-maximum (FWHM) of the power spectral density. A second common method is to define the root mean square (RMS) bandwidth, $\Delta v$, according to $$\Delta v = \sqrt{\frac{\int_{-\infty}^{+\infty}(v-\langle v\rangle)^2 P(v)dv}{\int_{-\infty}^{+\infty} P(v)dv}} \quad (1)$$

where $\langle v\rangle$ denotes a measure of the center optical frequency and can be defined as, $$\langle v\rangle = \frac{\int_{-\infty}^{+\infty} vP(v)dv}{\int_{-\infty}^{+\infty} P(v)dv}. \quad (2)$$

Alternatively, the optical bandwidth can be defined as the total edge-to-edge optical bandwidth of the useable imaging light generated by the source. This edge-to-edge optical bandwidth measure can for example exclude the amplified spontaneous emission background from a laser source. The edge-to-edge definition is, for example, well-suited to swept-wavelength and stepped-wavelength light sources.

It can be understood that the above denotes a set of exemplary quantifications of the optical bandwidth of an illumination beam and that the above does not exclude further methods for quantifying optical bandwidth.

The system is configured to direct light to the sample in a first state (511*a*) characterized by $P_1(v)$, $\langle v_1\rangle$, and $\Delta v_1$, and in at least a second state (511*b*) characterized by $P_2(v)$, $\langle v_2\rangle$, and $\Delta v_2$. In this first set of preferred embodiments, the first state can be configured to provide a better axial resolution and lower SNR relative to the second data by configuring the light source such that $\Delta v_2 = A \times \Delta v_1$ for $A<1$. In one embodiment, $A=0.5$ which provides a 3 dB improvement in imaging SNR. A 3 dB improvement in SNR is modest but sometimes meaningful and would in some applications justify the complexity associated with the configuration of the system to provide two illumination states. In a further embodiment, A can be configured to be 0.25, which would provide a mechanism to increase SNR by 6 dB, a significant enhancement in most imaging applications. In a further embodiment, A can be configured to be 0.1, which would provide a mechanism to increase SNR by 10 dB, a dramatic enhancement to the image that can be used, for example, to see significantly deeper into a sample or to resolve structures that are slightly below or near the noise floor of the imaging system.

In some embodiments of the invention, the illumination states include a change in the optical bandwidth but are configured to deliver approximately the same average optical power to the sample. This can be used in scenarios wherein the average power to the sample is constrained by safety requirements. For example, in retinal imaging, the average power is limited to approximately 2 mW by some American National Standards Institute (ANSI) documents. At the same time, imaging SNR is a critical parameter. This invention provides a mechanism to improve SNR while maintaining the power at the maximum permissible power level and maintaining the imaging speed. This is done by using illumination with reduced optical bandwidth, which trades axial resolution for imaging SNR. In scenarios wherein more SNR is needed, but neither the imaging power nor the imaging speed can be changed, this invention provides a mechanism for increasing SNR by sacrificing axial resolution. In some embodiments, the power difference provided to the sample may vary somewhat between illumination states, but the variation in optical power can be less than the variation in the optical bandwidths between the illumination states. For example, if the bandwidth changes by a factor of 4 (A=0.25), the power in these configurations might change by a factor that is less than 4, such as for example by 10%. These power changes may for example be an unintended consequence of using the source in a different configuration. An alternative way to express these relationships is that the ratio of the bandwidth of the broader-bandwidth illumination to the bandwidth of the narrower-bandwidth illumination in various embodiments is at least 2, at least 4, at least 10, etc.

In various embodiments, the power level of a first illumination state is approximately 50% of the power level of a second illumination state. In some embodiments, the power level of the first illumination state is approximately 75%, approximately 90%, approximately 95%, or approximately 99% of the power level of the second illumination state. In some embodiments, the power level of the first illumination state is substantially equal to (e.g., at least 90% of) the power level of the second illumination state. This can be true for embodiments wherein the first illumination state provides a broader optical bandwidth relative to the second state, or in embodiments when the first illumination state provides a narrower optical bandwidth relative to the second.

The OCT system can be configured to control which of the available illumination states is used by a signal or set of signals provided to the OCT system from a computer arrangement. The computer arrangement can be the same as that which receives the imaging data and generates images. The control over which illumination state is to be used can be based on a user selection, on a preprogrammed sequence, the properties of previously acquired OCT imaging data, or another source of information. The system can switch between illumination states between each OCT depth-scan (A-line), or between each OCT frame, or between each OCT acquisition volume, or some combination of the above. The OCT system can also be configured to apply particular illumination states in specific pre-determined locations within a three-dimensional scan. For example, in a retinal imaging experiment, the system can be configured to deploy at least the lower optical bandwidth illumination state in regions near the optic nerve head where the retinal thickness increases and additional SNR can be useful in resolving the deeper tissue layers such as the lamina cribosa. The system can be configured to acquire imaging data using a multitude of illuminate states at the same location in the sample such that both high axial resolution and high SNR imaging data are provided for that location

Embodiments with a Broadband Optical Source

In one preferred embodiment of multi-state illumination, an OCT system comprises at least two broadband spectral source 601*a*, 601*b*. These sources can be for example an amplified spontaneous emission (ASE) source, a superluminescent diode (SLD), a supercontinuum source, or a mode-locked laser source. Each illumination state has a corresponding bandwidth, defined here as an example as the full width at half-maximum measured from a graph of power as a function of wavelength. Alternative definitions of bandwidth such as those described above can be used. Interference signals are detected between a sample 603 and a reference mirror 604 using at least one spectrometer 605. The sources 601a and 601b provide different spectral outputs of 612a and 612b. The power of each source is controlled by a computer arrangement 620 through signals 620a and 620b. The spectral properties of the light 610 provided to the sample 603 are configured based on the control signals 620a and 620b. These sources can be combined in an optical element 611 that can be a passive power combiner (beamsplitter), a polarization-based combiner, or an active optical switch. The power provided by each source can be controlled by 620a, 620b to achieve a nominally consistent power delivery to the sample but provide a tunable optical bandwidth. Alternatively, the sources can be configured to provide a fixed output power and a variable attenuators 630a, 630b, 630 can be placed in the OCT system to control the optical power of the light 610.

In another preferred embodiment, the OCT system includes a tunable spectral filter configured to control the spectral properties of the illumination light provided to the sample. This spectral filter can adjust the transmission as a function of wavelength, and it can be used to control the average power, center optical frequency, and optical bandwidth. A computer arrangement can provide a control signal to configure this spectral filter or it can be configured manually. A spectral filter can be based for example on microelectromechanical (MEMs), acousto-optic filters, tunable fiber Bragg gratings, tunable long-period gratings, or other optical filter technologies known in the art. The spectral filter can be used to reduce the optical bandwidth relative to the less filtered state. In doing this filtering, the spectral filter may also shift the center optical frequency of the source. For example, a first illumination state may provide light centered at 850 nm with an optical bandwidth (FWHM) of 70 nm, while the second illumination state may provide light centered at 900 nm with an optical bandwidth (FWHM) of 10 nm.

In another preferred embodiment, the OCT system can utilize a semiconductor-based light source such as an SLD or a semiconductor optical amplifier (SOA) which provides an optical bandwidth that is controlled in part by the current provided to the device. In one embodiment, the SOA devices can include quantum dot sources and amplifiers.

An external gain source such as an SOA or a variable optical attenuator can be used to control the power of the illumination light that is directed to the sample, in order to decouple the optical bandwidth configuration with the illumination power and for example to offset changes in optical power that are induced by filtering. The external gain source can be gain modulated to yield a set of specific output powers for each illumination state.

Embodiments with a Wavelength-Swept Optical Source

Figure 7:
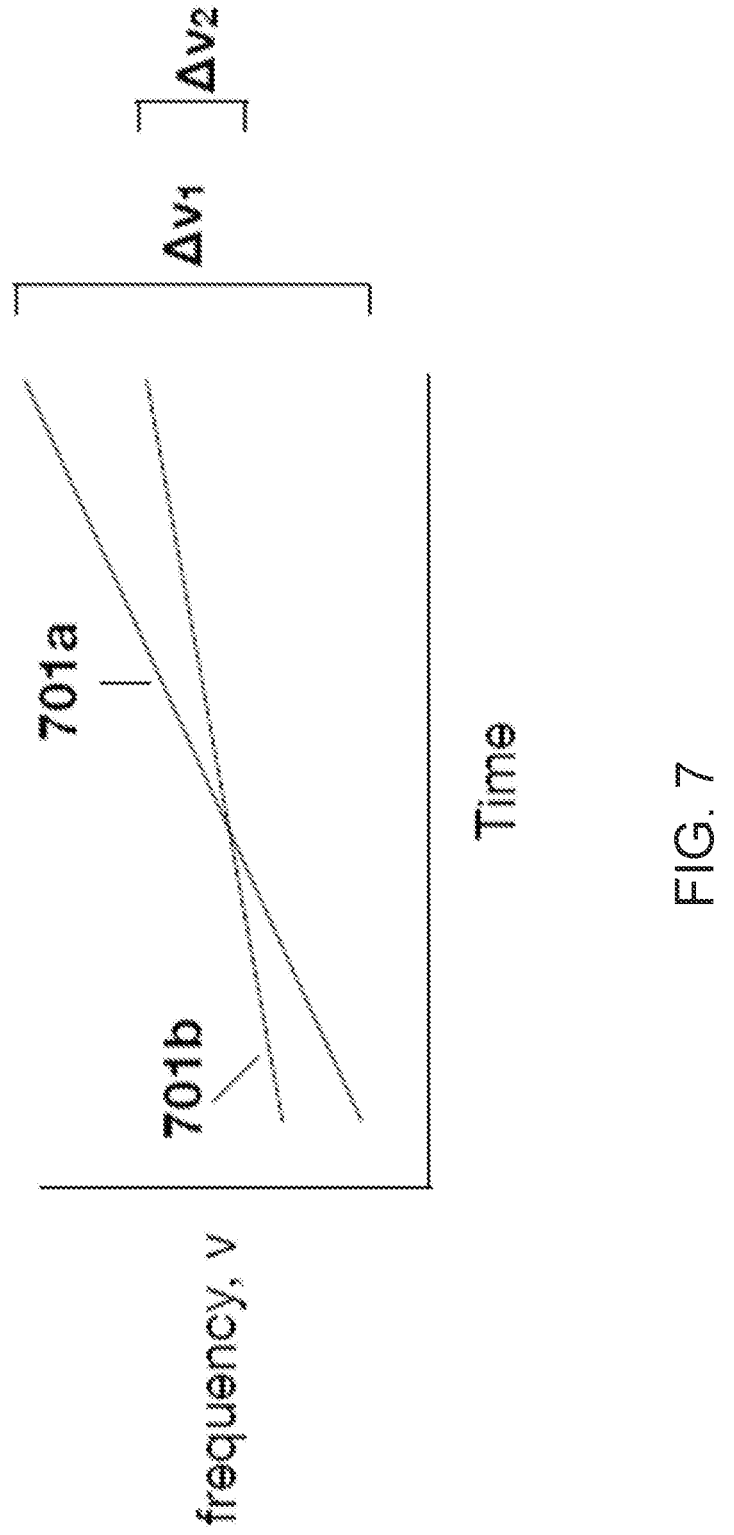
FIG. 7 illustrates a time-varying optical frequency light source with two or more configurations according to various embodiments of the present disclosure described herein.

In a further embodiment of multi-state illumination, an OCT system is constructed using a wavelength-swept optical source which provides light with a time-varying optical frequency to the sample. Each illumination state has a corresponding bandwidth, defined here as an example as the edge-to-edge bandwidth as previously described. Additional measures of optical bandwidth can be applied. The source can be configured to provide light in a first state that is characterized by a frequency tuning as a function of time (FIG. 7, 701A) across a first bandwidth $\Delta v_1$ and to provide light in at least a second state that is characterized by a frequency tuning as a function of time 701B across a second bandwidth $\Delta v_2$. The average power of the light that is delivered to the sample can be configured to be approximately the same for each state. The wavelength-sweep rate of the source can be approximately the same between the two states or can be changed between the two states.

In one embodiment, the wavelength-swept light can be generated by a single laser source that can be configured to provide light with different optical bandwidths. This can be based on a laser design that includes a mechanically driven optical filter and by controlling the signal provided to that filter. This can for example be by controlling the peak-to-peak amplitude provided to a Fabry-Perot filter located inside a laser cavity, or by controlling the peak-to-peak amplitude provided to a moving mirror that can, for example, be based on MEMs, a resonant scanner, or a galvanometric mirror.

In a further embodiment, the wavelength-swept light can be generated by a laser source that does not include a mechanical optical filter and is configured by a voltage or current signal such as that provided by Vernier-tuned distributed feedback sources.

In a further embodiment, the wavelength-swept light can be generated by a set of laser sources, each of which provides an approximately fixed optical bandwidth but that can be configured to be turned on or off to control the optical bandwidth provided to the sample. Alternatively, each laser source can be controlled to provide a bandwidth over a particular range, and these sources can be used in isolation or in combination to effect a larger optical bandwidth or a more narrow optical bandwidth.

In a further embodiment, a wavelength-swept source can be configured to provide at least two illumination states by controlling the sweep profile of the wavelength-swept source. In this configuration, the wavelength-swept laser operates with an optical frequency versus time curve and optical power versus time curve. The average power and the optical bandwidth provided to the sample, both measured as averaged over the sweep of the source, are a function of both of these curves. For example, a source can be configured to provide two illumination states that both follow the same optical frequency versus time curve, but that have two different optical power versus time curves. In the first state, the instantaneous optical power can be constant, for example, equal to 2 mW. In the second state, the instantaneous optical power can be reduced below 2 mW for optical frequencies that are far from the mean, and increased above 2 mW for optical frequencies that are close to the mean. This embodiment provides an average optical power in the second state that is the same as the first state (2 mW) but provides a smaller optical bandwidth measured by the RMS optical bandwidth calculated by Eq. 1.

Alternatively, the optical power versus time curves can remain fixed, but the optical frequency versus time curve can be modified. For example, in the first state, the optical frequency versus time can follow a linear trend. In a second state, the optical frequency can sweep more rapidly through optical frequencies that are further from the center optical frequency, relative to the sweeping of optical frequency at or near the center optical frequency. In this configuration, the average optical power provided by the two states is the same, but the RMS optical bandwidth averaged over the sweep is smaller for the second state (which delivers less energy at the edges due to the faster laser sweep rate at these locations).

It can be seen that these embodiments described above are exemplary of a broader set of configurations for modifying the optical power versus time and/or optical frequency versus time curve such that two illumination states with different optical bandwidths are provided.

In embodiments wherein the optical frequency versus time curve is non-linear, the OCT system can be configured to digitize these signals at a fixed clock rate that is, for example, determined by the sampling rate required when the laser is sweeping most rapidly. Signal processing such as digital filtering or moving averaging can be used to process the digitized signals to extract the higher SNR of the more slowly sweeping portions. The filtering provided can vary over time and can be responsive to the laser optical frequency sweep rate. For example, the digitized signal at portions wherein the laser frequency is sweeping at $\frac{1}{10}$th of the speed of the fastest portion can be processed with a moving average over 10 adjacent digitized samples. This yields measurement data at the same spectral spacing but takes advantage of the oversampling provided by slower sweep speeds. A moving average filter can be replaced by a digital signal processing (DSP) filter that achieves a similar benefit.

Embodiments with a Discretely Structured Broadband Illumination

In a further embodiment of multi-state illumination, a broadband optical source that comprises a set of discrete lines including but not limited to a frequency comb source can be used following the approaches described in the section "Embodiments with a broadband optical source." In such configurations, the optical bandwidth can be defined using edge-to-edge bandwidth or the RMS bandwidth, for example, among other measures. FWHM definitions can be used and stipulated to be calculated across the envelope of the spectrum, as is common in the art, rather than as a measure of a single discrete optical line.

Embodiments with Optical Frequency Stepped Illumination

In a further embodiment of multi-state illumination, an optical source that temporally steps between discrete optical frequencies including but not limited to the optical frequencies of an equally-spaced-in-optical-frequency comb can be used following the approaches described in the section "Embodiments with a wavelength-swept optical source." Each illumination state has a corresponding bandwidth, defined as an example as the edge-to-edge optical bandwidth. Such measurements may be performed over a time window that is adequate to capture all optical frequency components from which a Fourier Transformation will be applied to generate depth-resolved data. A temporally stepped optical frequency source can be based for example on phase-code mode-locking, stretched-pulse mode-locking, or another approach known to those in the art. A time-stepped optical frequency comb source can be programmed to provide a different illumination light to the sample by changing the sequence of optical frequencies. In one embodiment, the source provides sequences with different edge-to-edge optical bandwidths. In another embodiment, the source provides sequences that vary the number of times a given optical frequency is repeated, and thereby vary the RMS optical bandwidth by placing more power at these repeated optical frequencies. Processing can be configured to combine the measurements from repeated optical frequency samplings to provide a lower noise. Combinations of these two configurations can be employed to effect a modulation in the optical bandwidth provided to the sample.

Additional Embodiments

Figure 8:
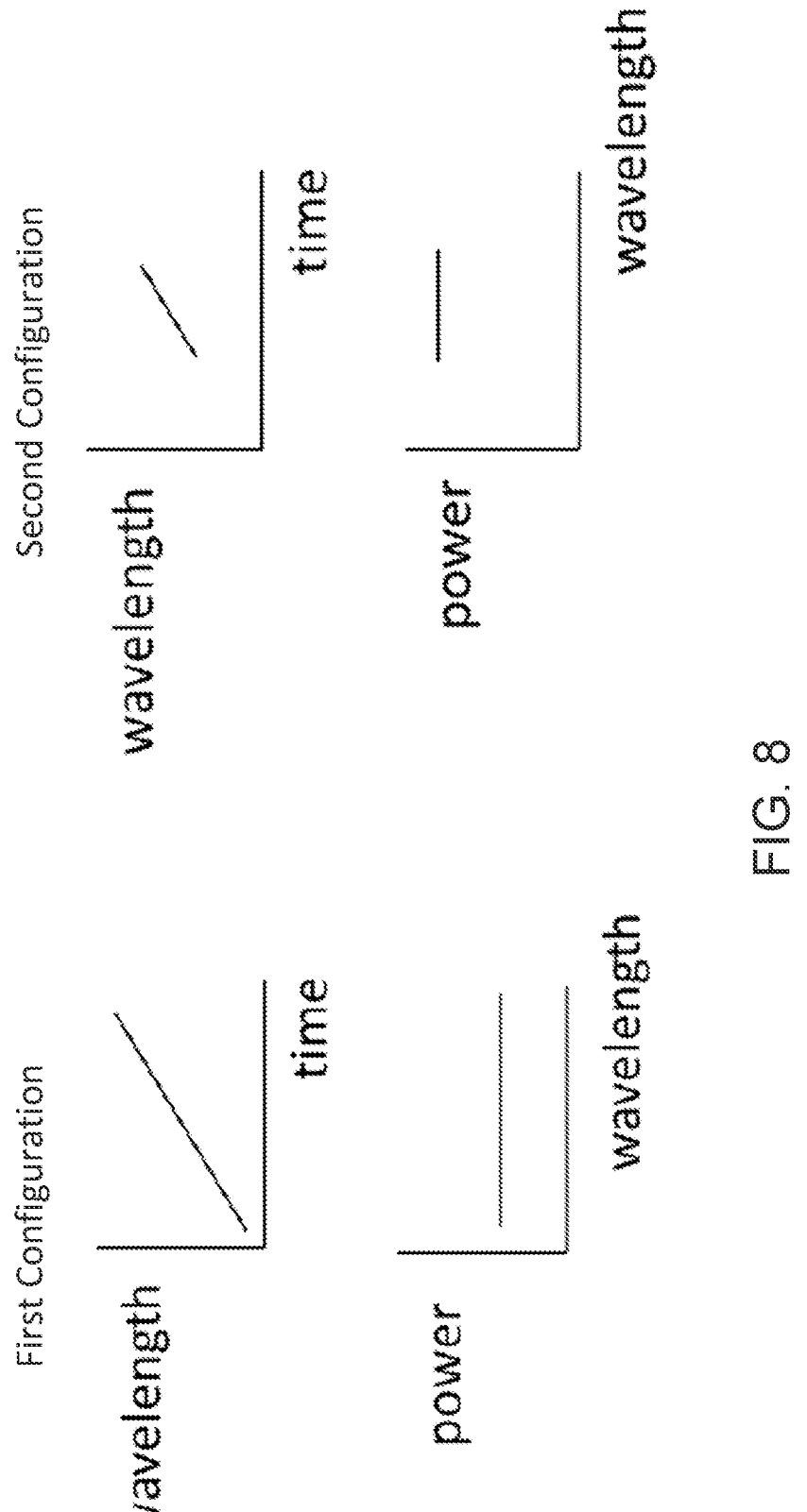
FIG. 8 illustrates the wavelength and power outputs of more than one configuration of one wavelength-swept laser according to various embodiments of the present disclosure described herein.

FIG. 8 illustrates the wavelength and power outputs of more than one configuration of one wavelength-swept laser, according to one embodiment of the present disclosure. In this embodiment, a single wavelength-swept laser can sweep across two or more optical bandwidth configurations. The wavelength sweeping refers to a change in wavelength as a function of time, in which consecutive wavelengths may or may not appear consecutively. A shorter optical bandwidth configuration would output a higher average power per unit wavelength than a longer optical bandwidth configuration. In this embodiment, multiple configurations would not operate simultaneously. Switching between the two or more configurations may be done manually via hardware, computationally via software, or in an automated, pre-programmed manner. This may be referred to in the field as a "swept-source" implementation.

Figure 9:
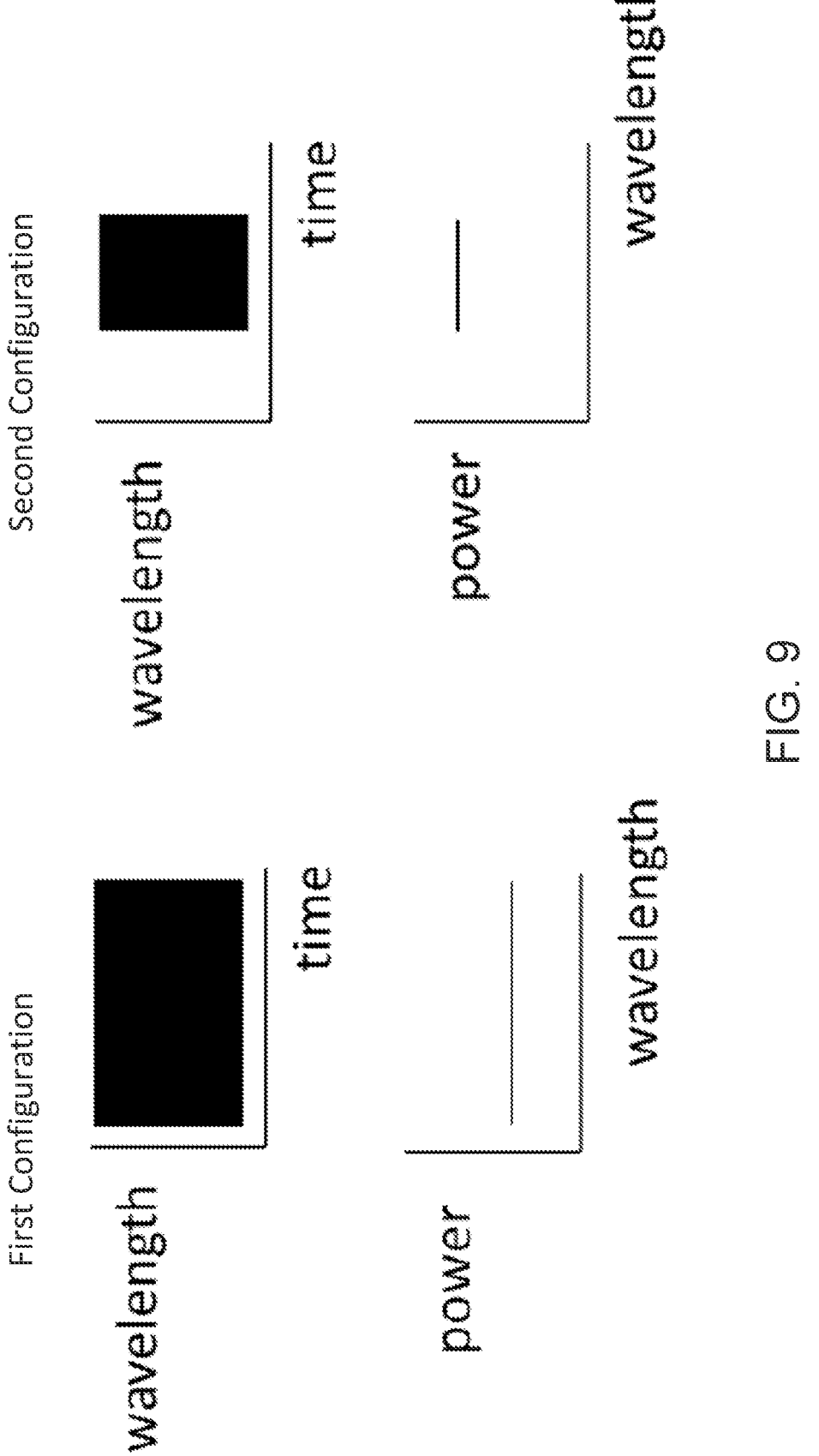
FIG. 9 illustrates the wavelength and power outputs of more than one configuration of one broadband laser source according to various embodiments of the present disclosure described herein.

FIG. 9 illustrates the wavelength and power outputs of more than one configuration of one broadband laser, according to one embodiment of the present disclosure. In this embodiment, a single broadband laser (including, but not limited to, a superluminescent diode or a supercontinuum laser) have two or more optical bandwidth configurations. In this embodiment, all wavelengths of each configuration are emitted simultaneously. A shorter optical bandwidth configuration would output a higher average power per unit wavelength than a longer optical bandwidth configuration. Multiple configurations would not operate simultaneously. Switching between the two or more configurations may be done manually via hardware, computationally via software, or in an automated, pre-programmed manner. This switching may be performed either within the laser or within the optical coherence tomography system. This may be referred to in the field as a "spectral domain" implementation.

Figure 10:
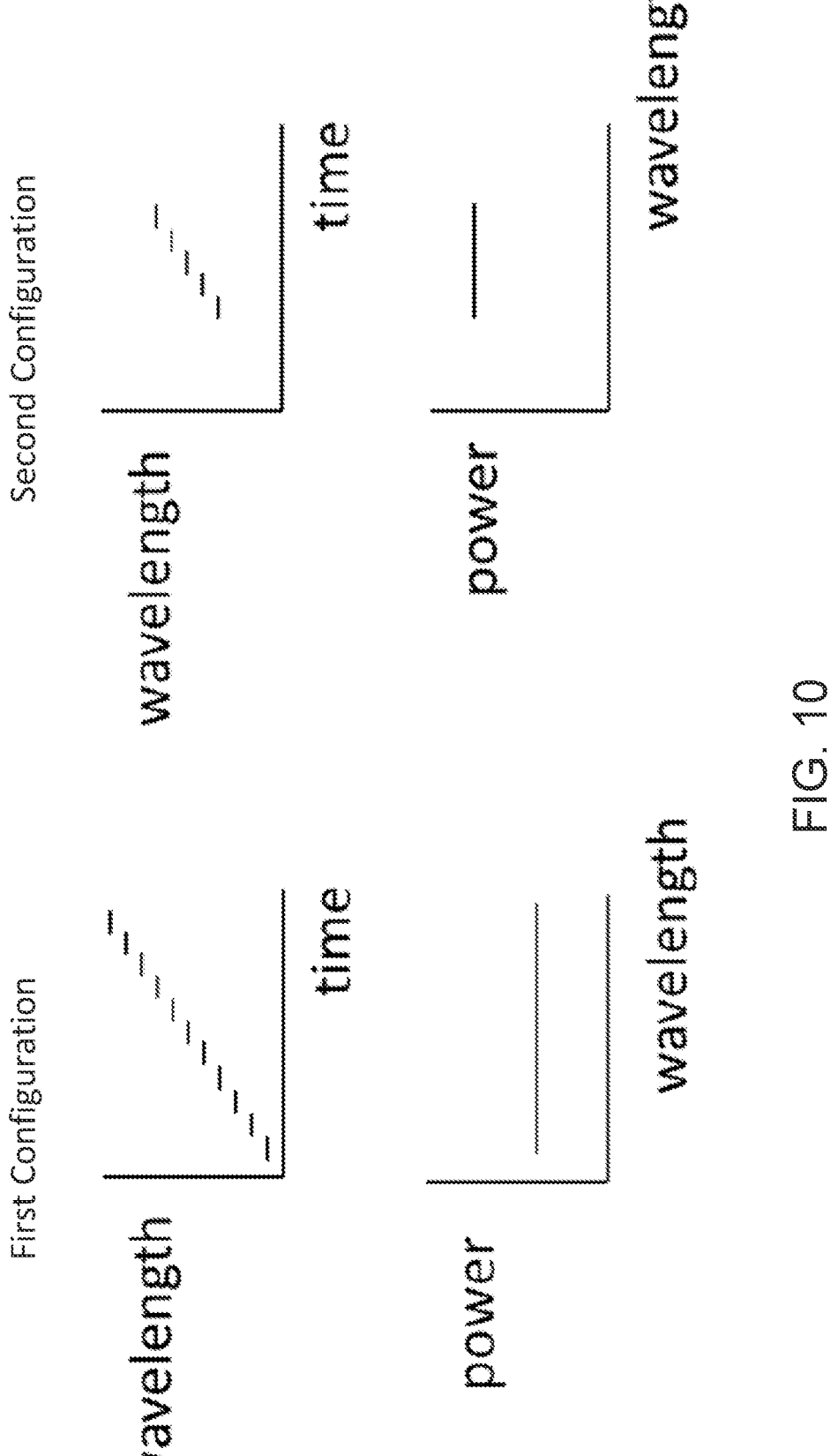
FIG. 10 illustrates the wavelength and power outputs of more than one configuration of one wavelength-stepped laser source according to various embodiments of the present disclosure described herein.

FIG. 10 illustrates the wavelength and power outputs of more than one configuration of one wavelength-stepped laser, according to one embodiment of the present disclosure. In this embodiment, a single wavelength-stepped laser can span across two or more optical bandwidth configurations. The wavelength stepping refers to a discrete change in wavelength as a function of time, in which consecutive wavelengths may or may not appear consecutively. A shorter optical bandwidth configuration would output a higher average power per unit wavelength than a longer optical bandwidth configuration. Switching between the two or more configurations may be done manually via hardware, computationally via software, or in an automated, pre-programmed manner. This may be referred to in the field as a "circular-ranging" implementation.

Figure 11:
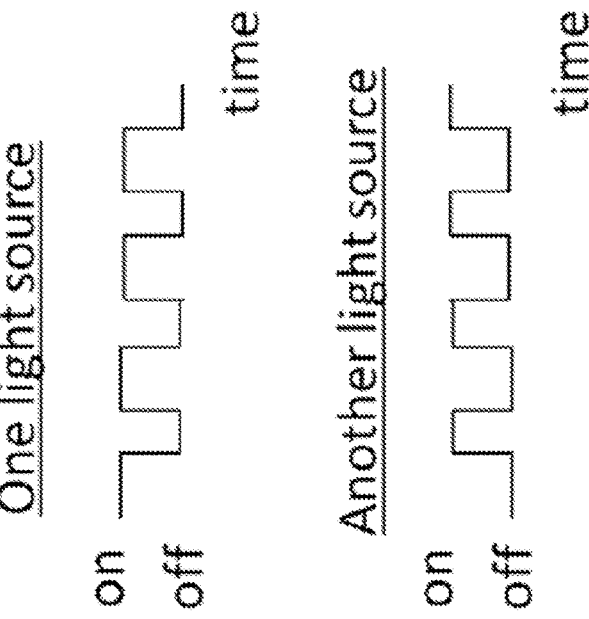
FIG. 11 illustrates an example of the use of two independent light sources, according to according to various embodiments of the present disclosure.
Figure 11:
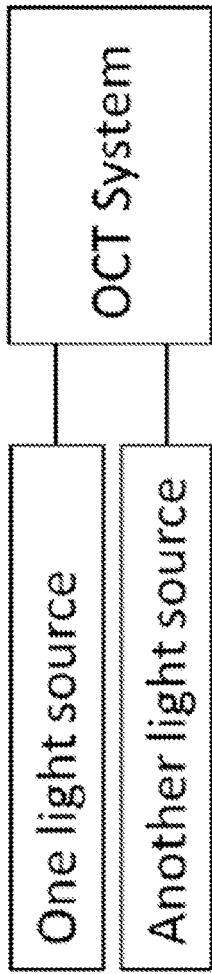

FIG. 11 illustrates an example of the use of two independent light sources, according to according to various embodiments of the present disclosure. Any combination of two or more independent light sources as documented in the other embodiments could be used in any combination for the purpose of trading off between axial resolution and signal-to-noise ratio. FIG. 11 shows an example whereby the light sources alternate being on and off. The on-and-off periods could follow any pattern, although the two sources may not operate simultaneously.

Any embodiment may result in the generation of data that requires processing to turn the raw data into an image. Such processing may include any typical OCT post-processing procedures that are known to those skilled in the art. Some of these steps may include resampling to linear wavenumber spacing, dispersion compensation, chirp compensation, spectral shaping, and Fourier transformation.

In each of the embodiments described above, it may be advantageous to configure the system such that the lateral resolution provided by the imaging system is substantially the same in the first and second illumination state. This can mean that the axial resolution, and therefore the imaging signal-to-noise ratio, is modulated between the illumination states without a significant change in lateral resolution. For example, in these embodiments the same optical apparatus used to focus the illumination light on the sample and to collect reflected light can be used during both illumination states without changing optical elements, e.g., without changing an objective or other lens.

EXAMPLE

The following provides a non-limiting example according to embodiments of the disclosure.

In optical coherence tomography (OCT), axial resolution and signal-to-noise ratio (SNR) are typically viewed as uncoupled parameters. In this Example, we show that this is true only for mirror-like surfaces and that in diffuse scattering samples such as biological tissues there is an inherent coupling between axial resolution and measurement SNR. We explain the origin of this coupling and demonstrate that it can be used to achieve increased imaging penetration depth at the expense of resolution. Finally, we argue that this coupling should be considered during OCT system design processes that seek to balance the competing needs of resolution, sensitivity, and system/source complexity.

The inverse relationship between optical bandwidth and imaging axial resolution is a defining property of optical coherence tomography (OCT). In this Example, we ask whether the optical bandwidth also affects the imaging signal-to-noise ratio (SNR). In asking this question, we put aside experimental complications that scale with source bandwidth, such as those related to source design and interferometer polarization-mode dispersion, and we focus on the fundamental relationship between the optical bandwidth and SNR. Stated in more practical terms, this Example asks whether there are scenarios in which one should purposely limit axial resolution performance to enhance the imaging SNR.

We conclude that optical bandwidth/axial resolution does influence the SNR, but that this is conditional on the nature of the sample. For specular reflections such as those from mirrors, there is no dependence of the SNR on optical bandwidth, whereas for diffuse scattering samples, such as biological tissues, there is a fundamental inverse relationship between the optical bandwidth and measurement SNR. Given that OCT is predominantly used to image diffuse scattering samples, we argue that this relationship should at minimum be appreciated, and that in some applications it should be considered during the design of the OCT system. We also show that it is because of this relationship that split-spectrum methods in OCT (e.g., spectral-binning polarization-sensitive OCT) are as effective as they are.

First we present a physical argument supporting the assertion that, in diffuse scattering samples, the measurement SNR is inversely proportional to the optical bandwidth used to make the measurement. Consider two swept-source OCT systems (the argument applies also to shot-noise-limited spectral-domain architectures) with equivalent optical power, A-line durations, and relative intensity noise, but with one sweeping over 100-nm optical bandwidth and the other over only 10 nm. For simplicity, we assume that each system uses a digitizer to capture its fringes with a fixed number of samplings during the A-line. The detectors and detector bandwidths are identical. For each, the noise performance is determined by the optical noise in the reference arm and is therefore equivalent, i.e., the optical bandwidth over which the laser traces have no impact on the measured noise. The signal power within each measurement voxel, or equivalently each bin of the eventual discrete Fourier transform of the digitized fringe, scales inversely with the optical bandwidth. This is because lower optical bandwidths capture a larger number of scattered photons from the diffusely scattering sample. The 100-nm system, for example, captures the backscattered light within an approximately 7-$\mu$m depth range, while the 10-nm system captures the backscattered light within a 70-$\mu$m depth range. There are 10× more scatterers within the 70-$\mu$m range than the 7-$\mu$m voxel (assuming constant reflectivity), leading to 10× higher sample arm power in each voxel, and a 10-fold higher SNR (10 dB). Stated concisely, this argument predicts that, for a diffuse scattering sample, the relationship between the measurement SNR of a voxel and measurement optical bandwidth ($\Delta v$) is given as $SNR_{diffuse} \propto (\Delta v)^{-1}$.

The same reasoning can be applied to a mirror, specular reflection, or other sub-axial resolution boundary to predict that the SNR is independent of optical bandwidth, i.e., $SNR_{specular} \propto (\Delta v)^{0}$. For these samples, all scatterers are co-localized at a single depth location, and so extending the measurement voxel depth extent does not admit additional scatterers into the voxel, and therefore does not increase the signal power.

This relationship can be seen in the conventional mathematical description of OCT if we are careful to describe specular and diffusely scattering samples accurately. We take as a starting point the cross correlation term of an OCT A-line. For a mirror sample, the OCT signal is emitted from a single reflector with field reflectivity $r_s$ located at an axial position $z_s$, and the cross correlation term, $i_{D*}$, is confined by the delta function, $\delta$, such that $$i_{D*}(z) = \frac{\rho}{4}[\gamma(z) \otimes r_r r_s \delta(z \pm 2z_{x*})], \tag{3}$$

where $\rho$ is the responsivity of the detector, $r_r$ is the field reflectivity of the reference arm, and we have assumed the reference arm is located at z=0. The parameter $\gamma(z)$ is the coherence function of the source and is normalized to $\gamma(0)=1$ by the assumption that the source power is held constant. The width of $\gamma(z)$, describing the axial resolution, can change. As expected, the measured signal at the mirror position, $i_{D*}(2z_z)$, does not depend on the width of $\gamma(z)$ and therefore does not depend on the optical bandwidth of the source.

For a diffusely scattering sample, the signal is a contribution from all of the scatterers across depth, each convolved with the coherence function. If we consider N scatterers located across a depth range that is larger than the width of the coherence function, the cross correlation term becomes $$i_{D*}(z) = \frac{\rho}{4}\left[\gamma(z) \otimes \sum_{n=1}^{N} r_r r_{sn} \delta(z \pm 2z_{sn})\right]. \tag{4}$$

For simplicity, we will consider the scatterer reflectivities $r_{sn}$ as real-valued, both positive and negative. Consistent with the diffuse scattering regime, we assume that there are numerous scatterers within the width of the coherence function. Assuming we are sufficiently deep within the sample that there are no surface effects to consider, the signal $i_{D*}(z)$ includes the sum of many single scattering events. The number of scatterers that contribute to this sum scales with the width of the coherence function; a wider coherence function admits more scatterers. The ensemble average of this signal, $\langle i_{D*}(z) \rangle$, then scales as the square root of the number of scatterers (random walk), which implies it scales with the square root of the width of $\gamma(z)$. The corresponding measurement intensity, $\langle |I_{D*}(z)|^2 \rangle$, is then directly proportional to the width of $\gamma(z)$ and so inversely proportional to $(\Delta v)$. Note that this relationship is exact only for cases wherein the source spectral shape (e.g., Gaussian) remains unchanged.

It is interesting to note that if we apply a similar mathematical reasoning to the autocorrelation terms [which are not included in Eqs. (3) and (4)], the SNR of the autocorrelation signal intensities is predicted to be inversely proportional to $(\Delta v)^2$.

The $SNR_{diffuse} \propto (\Delta v)^{-1}$ relationship is shown in logarithmic scale in FIG. 3. Additionally, it is instructive to explicitly include the A-line duration, $\tau$, into these SNR relationships. It is well known that the measurement SNR, regardless of sample type, scales linearly with $\tau$, yielding $SNR_{diffuse} \propto (\tau)(\Delta v)^{-1}$ and $SNR_{specular} \propto (\tau)(\Delta v)^0$.

Figure 12:
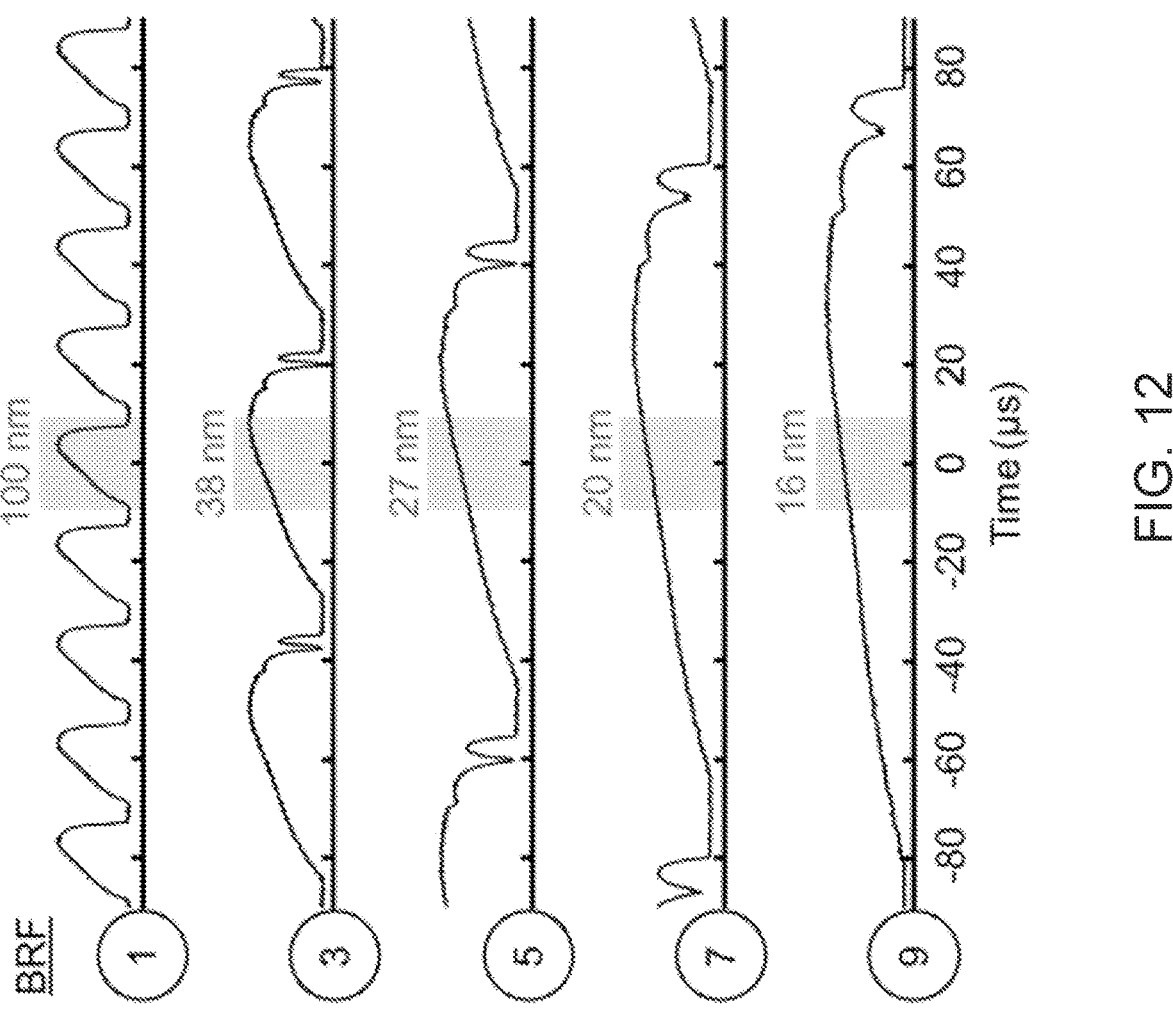
FIG. 12 shows Sampled spectra measured by an oscilloscope. The numbers in the left column represent the bandwidth reduction factor (BRF) controlled by the polygon mirror angular velocity, and the shaded regions indicate the optical bandwidths associated with a 20-μs acquisition. Trigger signals were shifted to maintain the same center wavelength.

To validate these relationships, we performed a series of imaging experiments using a swept source OCT system that allowed tuning of the optical bandwidth while holding the A-line duration constant and the average power approximately constant. The system was based on a polygon scanning mirror and was centered at 1.3 μm. The angular velocity of the polygon scanning mirror can be tuned over a large range, which modulates the A-line rate of the source correspondingly, as shown in FIG. 12. We reduced the rotation frequency of the polygon mirror by factors of 1 (full resolution, 50-kHz sweep rate), 3 (17-kHz sweep rate), 5 (10-kHz sweep rate), 7 (7.1-kHz sweep rate), and 9 (5.6-kHz sweep rate). We maintained the same digitizer sampling rate and A-line sample count (2048 unique sampling points over $\tau$=20 μs per A-line) for each acquisition. A small variation in optical power was induced by the spectral envelope of the source, primarily between the full bandwidth setting and all of the reduced bandwidth settings. A measurement of the spectral shape from an oscilloscope allowed us to correct for this variation. Laser chirp and system dispersion correction curves were calculated for each bandwidth configuration. A Hann window was applied prior to Fourier transformation to remove side lobes. A long working distance scan lens with an effective focal length of 54 mm (LSM54-1310, Thorlabs) was used as the microscope objective in the system. This minimized variations in the measurement SNR due to beam focusing Images of chicken breast were acquired and the SNR performance was analyzed at subsurface regions representative of diffuse scattering. For comparison, images of a mirror surface (representative of a specular reflection) were also acquired and analyzed. The SNR was evaluated for a constant A-line duration and varying optical bandwidths by physically changing the polygon speed as described above [FIG. 13(*a*)], and also for a fixed polygon rotation frequency (50-kHz A-line rate) but with the fringe duration ($\tau$) reduced in post-processing to achieve the same optical bandwidth [e.g., spectral windowing, FIG. 13(*b*)].

Figure 13:
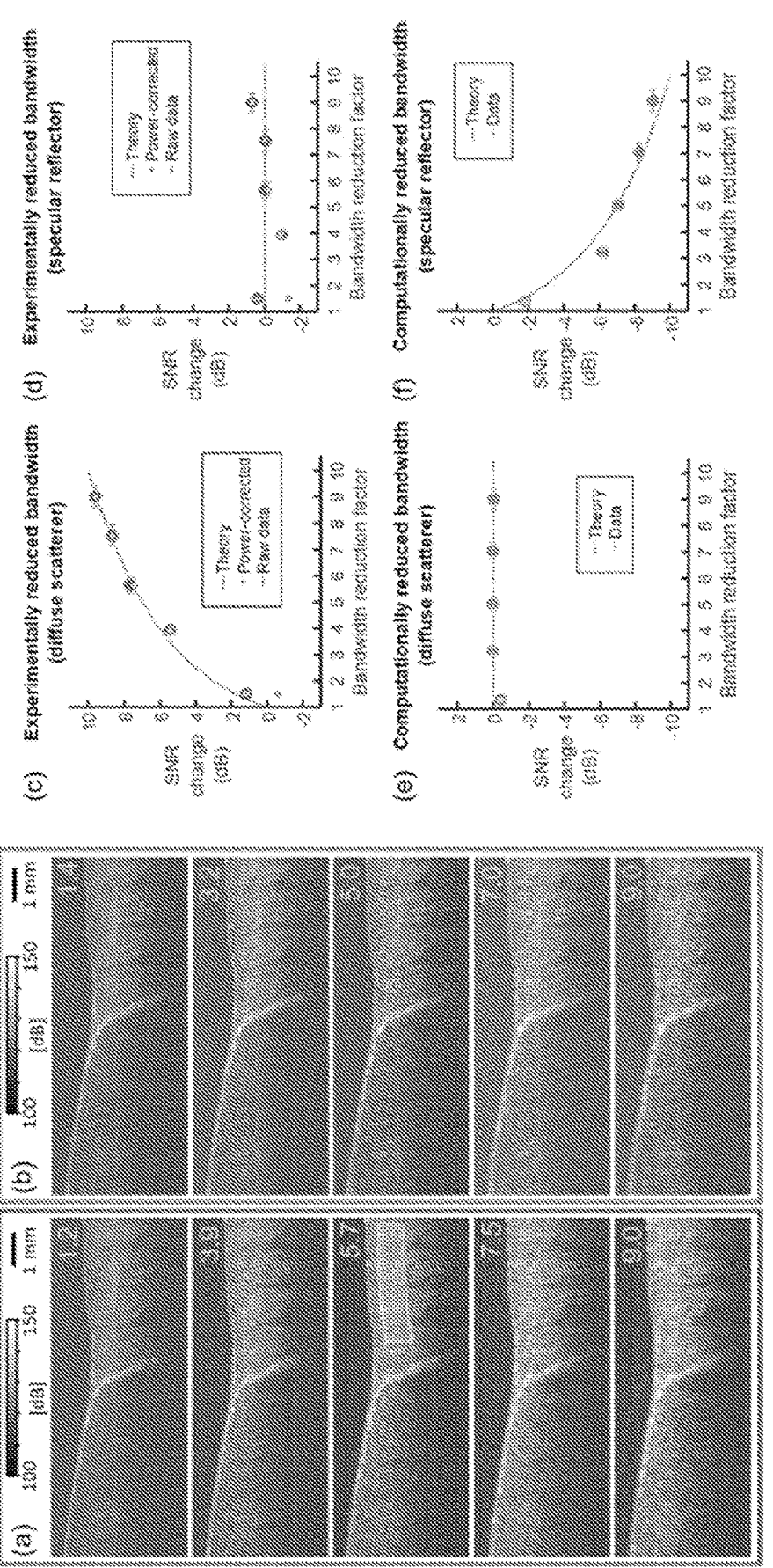
FIG. 13 shows measurements of the SNR dependence on optical bandwidth. (Panel a) Images of a diffuse tissue (chicken breast) with different experimental optical bandwidth reduction factors. (Panel b) Images of a diffuse tissue (chicken breast) with different computational optical bandwidth reduction factors. (Panel c) SNR as a function of experimental bandwidth reduction factor for the diffuse scattering area indicated by the yellow box in panel (a). (Panel d) SNR as a function of experimental bandwidth reduction factor for a mirror signal (OCT image not shown). (Panel e) SNR as a function of computational bandwidth reduction factor for the diffuse scattering area indicated by the yellow box in panel (a). (Panel f) SNR as a function of computational bandwidth reduction factor for a mirror signal (OCT image not shown). Note that the SNR of the diffuse scattering region [panels (c) and (e)] was calculated as the ratio of the mean signal power within the yellow box to the mean noise power measured above the tissue.

The results of this experiment confirm the scaling relationships described above. FIG. 13(*c*) demonstrates that SNR increases in diffuse scattering regions in proportion to the inverse of the optical bandwidth. FIG. 13(*d*) demonstrates that the SNR gain seen in FIG. 13(*c*) derives from the diffuse scattering feature of the sample. It is important to note that the mirror signals that are commonly used to characterize OCT system resolution and sensitivity would follow the scaling of FIG. 13(*d*) and not demonstrate a dependence on optical bandwidth. The axial resolution of an OCT system and the SNR of the images it produces, therefore, cannot be decoupled from one another, and the measured sensitivity must be used carefully as a predictor of the imaging SNR. FIG. 13(*e*) shows that the SNR in diffuse regions remains largely unchanged when the optical bandwidth is computationally reduced. This is interesting because it is representative of spectral windowing processing approaches wherein a narrow portion of the acquired fringe is processed, causing the optical bandwidth and the effective A-line duration to decrease. These two effects (more photons within the coherence gate due to resolution degradation and fewer detected photons due to reduction of measurement duration) have opposing effects on the SNR. For a constant spectral envelope, these effects cancel exactly and the SNR is not affected. While it has never been explicitly stated, this is in fact why these approaches can be used in split-spectrum angiography, spectral-binning polarization-sensitive OCT, frequency compounding for speckle reduction, and spectroscopic or hyperspectral OCT without SNR penalty (within the diffuse scattering regime). FIG. 13(*f*) shows that for a specular reflector, however, an SNR penalty will be observed when these windowing methods are applied. Herein lies the SNR/axial resolution trade-off, and next we demonstrate how the reduction of optical bandwidth can be used to achieve deeper imaging penetration at the expense of axial resolution (FIG. 14).

Figure 14:
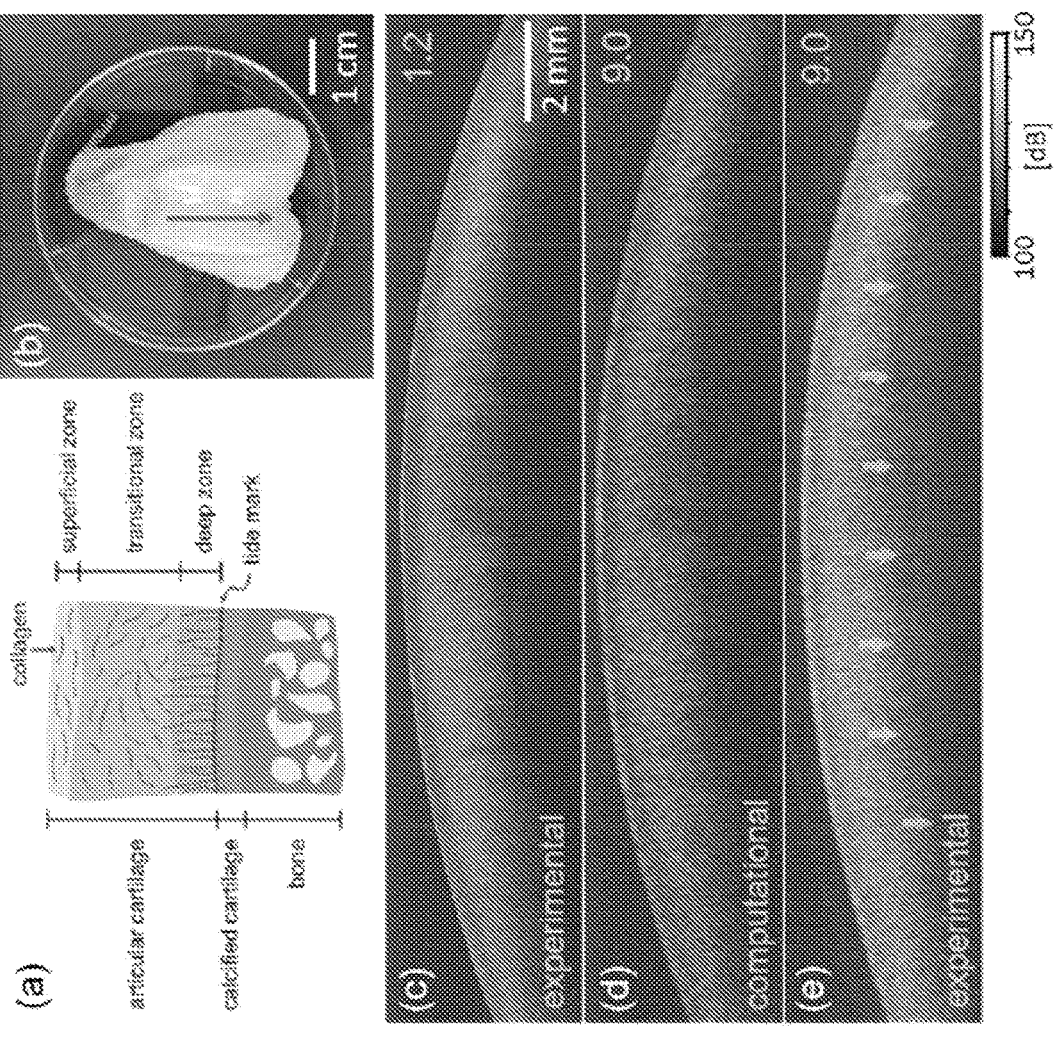
FIG. 14 shows results of porcine knee cartilage imaging. (Panel a) Diagram of the structure of the porcine knee. (Panel b) Color photograph of the imaged region. Red line indicates the location of the images in panels (c)-(e), and the arrow indicates the direction of scanning [left to right on panels (c)-(e)]. (Panel c) Full resolution OCT image. (Panel d) Computationally and (Panel e) experimentally generated 9× bandwidth reduction. Yellow arrows indicate the tide mark between the articular cartilage and the subchondral bone, which is only visible by acquiring with reduced bandwidth.

Porcine knee cartilage is a relatively thick (~2 mm) and fairly homogeneous tissue with a cartilage-bone interface that is often at the edge of detectability by OCT [FIG. 14(*a*)]. In a scenario where the articular cartilage thickness is the critical parameter, our results above would argue that it may be advantageous to image with a dramatically reduced optical bandwidth to prioritize the SNR performance. We imaged a knee sample [color photograph in FIG. 14(*b*)] using the same protocol as described above. FIG. 14(*c*) shows a cross-sectional image for a full resolution acquisition, while FIGS. 4(*d*) and 4(*e*) demonstrate ⅑ optical bandwidths from computationally and experimentally windowed data, respectively. It is clear that experimental acquisition with ⅑ bandwidth provides the best visibility of the tide mark boundary. Additional applications in which this may be useful include tumor boundary demarcation or industrial tablet coating thickness measurements.

At the other end of the SNR-resolution optimization continuum, if the goal of a study was to investigate the microstructure of a material containing many boundary-like features, then the axial resolution is of utmost importance. In that case, the SNR of those boundary features will not be compromised, assuming they are specular, but a region of more homogeneous scattering would be. This phenomenon may also play a role in contrast improvement between these boundary-type signals and distributed scatterer signals when measured with high-resolution OCT. In a recent manuscript, a high-resolution (1.2 μm) visible light OCT system visualized highly scattering cell bodies located within the traditionally less-scattering nuclear layers of the retina. Our results suggest that since these cell bodies appear on the scale of the axial resolution of the system, their SNR is not affected by the higher resolution. In contrast, the background of the nuclear layer does see an SNR reduction, and so the "cell-body-to-nuclear-layer" intensity ratio increases when imaged by the higher resolution system. Further study would be required to verify this effect as the source of heightened contrast.

With recent advances of laser technology allowing for partially coherent light across a large spectral bandwidth, there has been a drive within the OCT community toward increasingly high axial resolution. Until now, the sensitivity measurements performed on high-resolution systems have been compared with those on lower resolution systems on a like-for-like basis. Many systems which report axial reso- lutions of the order of 1 µm are based on supercontinuum light sources which are widely accepted to be noisy. Even though such systems are approaching shot-noise limited sensitivity, this work outlines that they will continue to produce images with a lower image SNR than their more limited optical bandwidth counterparts.

There are also some physical limitations to the achievable SNR enhancement. As the axial resolution approaches the size of the sample structure under investigation, the distrib- uted scatterer approximation no longer holds, and the entire structure then falls into the surface boundary regime wherein the SNR is independent of optical bandwidth/axial resolu- tion. There is also a limit to the SNR improvement that can be achieved by degrading the axial resolution through band- width reduction. This limit can result from the depth- dependent attenuation of the signal, which diminishes the signals from the lower portion of the voxel relative to the upper portion, or from the confocal gate. The latter is of course most relevant to optical coherence microscopy sys- tems. Finally, it is tempting to conclude from this work that an uncorrected dispersion imbalance in the interferometer or chirped fringe, both of which degrade the axial resolution, would result in an improved SNR. However, this neglects the attenuation of the point spread function that accompanies a dispersion/chirp-induced PSF broadening. Because of this attenuation, dispersion/chirp does not increase the number of photons within a single coherence gate, and therefore does not improve the SNR.

Traditionally, OCT system design has balanced the benefit of high axial resolution against the practical and engineering challenges of using extremely broadband optical sources. In this work, we have shown that a high axial resolution can also result in a lower SNR. It may be advantageous therefore to image with deliberately reduced axial resolution in some applications.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following claims.

What is claimed is:

1. An optical coherence tomography (OCT) system, com- prising:
   a light source configured to provide a first illumination and a second illumination to a diffuse scattering sample,
       the first illumination providing light within a first bandwidth and the second illumination providing light within a second bandwidth narrower than the first bandwidth;
   an OCT optical arrangement comprising a sample light path and a reference light path, each of which is optically coupled to the light source to generate inter- ference data from the sample;
   a detector optically coupled to the OCT optical arrange- ment and configured to collect the interference data from the sample; and
   a controller configured to:

switch illumination provided to the OCT optical arrangement between the first illumination and the second illumination,
   the interference data comprising first interference data obtained using the first illumination and sec- ond interference data obtained using the second illumination,
determine a first signal-to-noise ratio (SNR) of the first interference data and a second SNR of the second interference data,
   wherein the second SNR is greater than the first SNR, and
collect, based on the second SNR being greater than the first SNR, images from a second depth within the sample using the second illumination and from a first depth using the first illumination, wherein the second depth is greater than the first depth.

2. The system of claim 1, wherein the controller is configured to determine a first axial resolution of the first interference data and a second axial resolution of the second interference data,
   wherein the first axial resolution is smaller than the second axial resolution.

3. The system of claim 1, wherein a ratio of the second bandwidth to the first bandwidth is 0.5 or less.

4. The system of claim 1, wherein a ratio of the second bandwidth to the first bandwidth is 0.25 or less.

5. The system of claim 1, wherein a ratio of the second bandwidth to the first bandwidth is 0.1 or less.

6. The system of claim 1, wherein at least one of the first bandwidth or the second bandwidth is determined based on determining at least one of a full-width and half-maximum (FWHM) of a power spectral density, a root mean square (RMS) bandwidth, or a total edge-to-edge optical bandwidth of a useable imaging light of the light source.

7. The system of claim 1, wherein the light source emits the first illumination during a first time period and the second illumination during a second time period different from the first time period.

8. The system of claim 7, wherein the light source comprises at least one of a swept source, a comb source, or a stepped source, and
   wherein the first bandwidth or the second bandwidth is determined based on determining an edge-to-edge opti- cal bandwidth of a useable imaging light of the light source.

9. The system of claim 7, wherein the detector is config- ured to collect the interference data from the sample as a function of time.

10. The system of claim 9, wherein the detector comprises at least one of a single-ended detector or a balanced detector.

11. The system of claim 1, wherein the light source comprises a first light source configured to provide the first illumination and a second light source configured to provide the second illumination, and
   wherein the controller is configured to switch between transmitting the first illumination to the sample from the first light source and the second illumination to the sample from the second light source.

12. The system of claim 11, wherein at least one of the first light source or the second light source comprises a broadband light source.

13. The system of claim 12, wherein the detector is configured to collect the interference data from the sample as a function of wavelength.

14. The system of claim 13, wherein the detector com- prises a spectrometer.

15. The system of claim 1, wherein a first lateral resolution of the first interference data is equal to a second lateral resolution of the second interference data.

16. An optical coherence tomography (OCT) system, comprising:

a light source configured to provide a first illumination and a second illumination to a diffuse scattering sample, the first illumination providing light within a first bandwidth and the second illumination providing light within a second bandwidth narrower than the first bandwidth;

an OCT optical arrangement comprising a sample light path and a reference light path, each of which is optically coupled to the light source to generate interference data from the sample;

a detector comprising a spectrometer optically coupled to the OCT optical arrangement and configured to collect the interference data from the sample as a function of wavelength; and a controller configured to:

switch illumination provided to the OCT optical arrangement between the first illumination and the second illumination, the interference data comprising first interference data obtained using the first illumination and second interference data obtained using the second illumination, and a ratio of the first bandwidth to the second bandwidth being at least 2, determine a first signal-to-noise ratio (SNR) of the first interference data and a second SNR of the second interference data, wherein the second SNR is greater than the first SNR, and collect, based on the second SNR being greater than the first SNR, images from a second depth within the sample using the second illumination and from a first depth using the first illumination, wherein the second depth is greater than the first depth.

17. An optical coherence tomography (OCT) system, comprising:

a light source configured to provide a first illumination and a second illumination to a diffuse scattering sample, the first illumination providing light within a first bandwidth comprising a first wavelength vs. time profile and a first power vs. time profile, and the second illumination providing light within a second bandwidth narrower than the first bandwidth, the second illumination comprising a second wavelength vs. time profile and a second power vs. time profile;

an OCT optical arrangement comprising a sample light path and a reference light path, each of which is optically coupled to the light source to generate interference data from the sample;

a detector optically coupled to the OCT optical arrangement and configured to collect the interference data from the sample; and a controller configured to:

control the light source to switch illumination provided to the OCT optical arrangement between the first illumination and the second illumination by controlling at least one of the first wavelength vs. time profile or the first power vs. time profile of the first illumination and by controlling at least one of the second wavelength vs. time profile or the second power vs. time profile of the second illumination, the interference data comprising first interference data obtained using the first illumination and second interference data obtained using the second illumination, determine a first signal-to-noise ratio (SNR) of the first interference data and a second SNR of the second interference data, wherein the second SNR is greater than the first SNR, and collect, based on the second SNR being greater than the first SNR, images from a second depth within the sample using the second illumination and from a first depth using the first illumination, wherein the second depth is greater than the first depth.

18. The system of claim 17, wherein the controller is configured to control the light source to switch illumination provided to the OCT optical arrangement to provide a higher SNR or a smaller axial resolution based on controlling at least one of the first wavelength vs. time profile or the first power vs. time profile of the first illumination and by controlling at least one of the second wavelength vs. time profile or the second power vs. time profile of the second illumination.

* * * * *